(12) United States Patent
Sisco et al.

(10) Patent No.: US 11,920,915 B2
(45) Date of Patent: Mar. 5, 2024

(54) NON-CONTACT MEASUREMENT FOR INTERFACE GAPS

(71) Applicant: The Boeing Company, Chicago, IL (US)

(72) Inventors: Farahnaz Sisco, Mukilteo, WA (US); Jeffrey Martin Devlin, Seattle, WA (US); Nathan Christopher McRae, Seattle, WA (US)

(73) Assignee: The Boeing Company, Chicago, IL (US)

( * ) Notice: Subject to any disclaimer, the term of this patent is extended or adjusted under 35 U.S.C. 154(b) by 98 days.

(21) Appl. No.: 17/567,674

(22) Filed: Jan. 3, 2022

(65) Prior Publication Data

US 2022/0326004 A1 Oct. 13, 2022

Related U.S. Application Data

(60) Provisional application No. 63/171,918, filed on Apr. 7, 2021.

(51) Int. Cl.
*G01B 11/14* (2006.01)
*B64F 5/60* (2017.01)
*G01B 9/02015* (2022.01)

(52) U.S. Cl.
CPC .............. *G01B 11/14* (2013.01); *B64F 5/60* (2017.01); *G01B 9/02023* (2013.01)

(58) Field of Classification Search
CPC .............. G01B 9/0205; G01B 9/02054; G01B 9/02023; G01B 11/14; G01B 11/24; B64F 5/60
See application file for complete search history.

(56) References Cited

U.S. PATENT DOCUMENTS

| 4,837,615 | A  | * | 6/1989  | Boshier      | B82Y 15/00  |
|           |    |   |         |              | 348/E7.087  |
| 7,016,052 | B2 | * | 3/2006  | Bloch        | G01B 11/026 |
|           |    |   |         |              | 356/601     |
| 7,216,408 | B2 |   | 5/2007  | Boyl-Davis et al. | |
| 7,380,776 | B2 |   | 6/2008  | Boyl-Davis et al. | |
| 8,336,222 | B1 | * | 12/2012 | Kostenick, Jr. | G01B 3/28  |
|           |    |   |         |              | 33/542      |
| 9,776,330 | B2 |   | 10/2017 | Day et al.   | |
| 2002/0109847 | A1 | * | 8/2002 | Drabarek     | G01B 9/02057 |
|           |    |   |         |              | 356/482     |
| 2004/0181148 | A1 | * | 9/2004 | Uchiyama     | A61B 1/07   |
|           |    |   |         |              | 600/173     |

(Continued)

FOREIGN PATENT DOCUMENTS

ES 2575383 T3 * 6/2016 ........... A61B 3/0008

OTHER PUBLICATIONS

Angle-resolved low-coherence interferometry; Wikipedia; Feb. 1, 2021.

(Continued)

*Primary Examiner* — Michael P LaPage
(74) *Attorney, Agent, or Firm* — Yee & Associates, P.C.

(57) ABSTRACT

Systems and methods are provided for inspection. One embodiment is a method for measuring a hole. The method includes driving a fiber optic probe into the hole, determining a profile by scanning the hole via the fiber optic probe, and determining whether an interface gap exists at the hole based on the profile.

27 Claims, 17 Drawing Sheets

(56) References Cited

U.S. PATENT DOCUMENTS

| | | | |
|---|---|---|---|
| 2007/0038052 A1* | 2/2007 | Swoyer | A61B 1/00165 600/345 |
| 2007/0153296 A1 | 7/2007 | Schick | |
| 2009/0213387 A1* | 8/2009 | Nakabayashi | G01B 9/02083 702/155 |
| 2011/0023888 A1* | 2/2011 | Vazales | A61B 1/00142 128/207.14 |
| 2012/0078121 A1* | 3/2012 | Ryan | A61B 5/0066 600/482 |
| 2019/0186902 A1 | 6/2019 | Kato et al. | |
| 2020/0171599 A1* | 6/2020 | Lessmueller | B23K 26/26 |
| 2020/0378749 A1 | 12/2020 | Ono et al. | |

OTHER PUBLICATIONS

Boreinspect system; www.novacam.com/products/boreinspect-for-3d-bore-metrology/#overview; Apr. 7, 2021.

Multiple scatering low coherence interferonetry; Wikipedia; Feb. 1, 2021.

Optical 3D Profilometer; Profiilometers for High-Precision Non-Contact 3D Metrology; Novacam. www.novacam.com/productsl Jan. 26, 2021.

Thompson et al., "Flex Track for use in Production," SAE Technical Paper 2005-01-3318, 2005, SAE International, Oct. 3, 2005, 7 pages.https://doi.org/10.4271/2005-01-3318.

European Search Report; Application EP22160433; dated Jul. 29, 2022.

\* cited by examiner

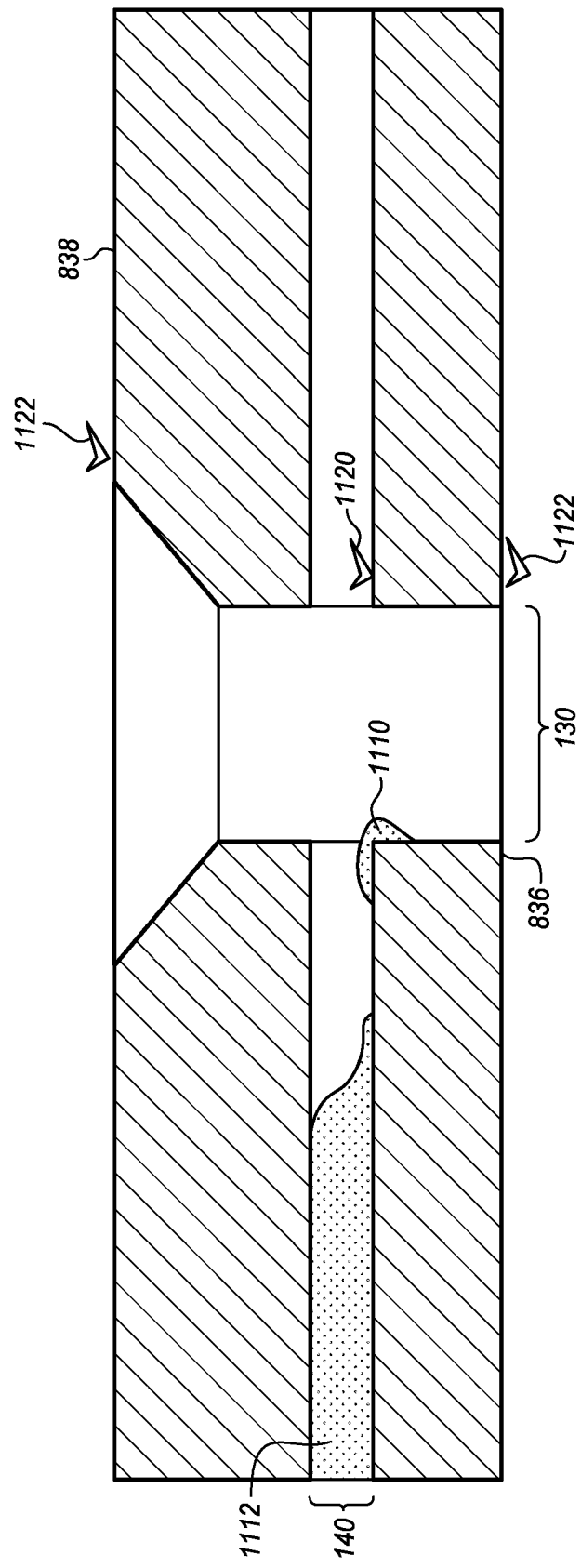

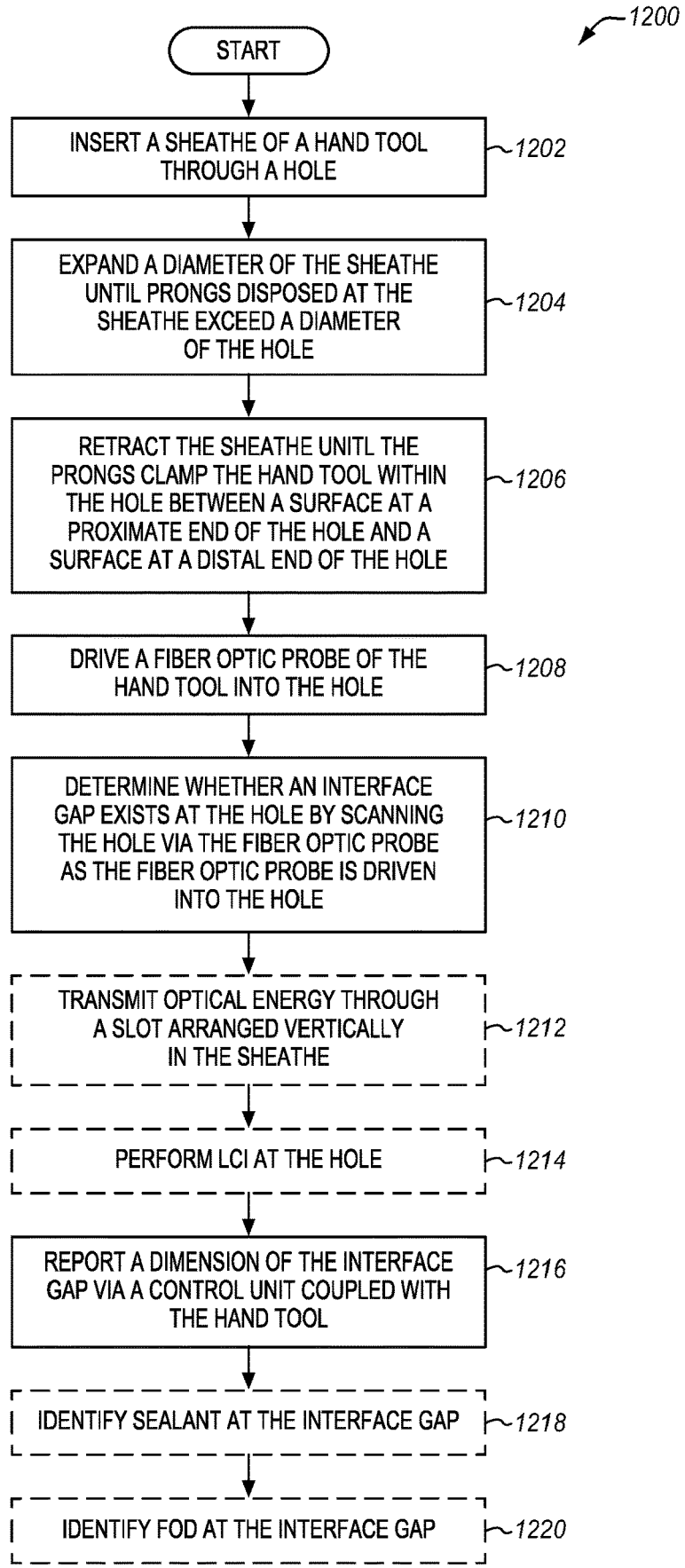

NON-CONTACT MEASUREMENT FOR INTERFACE GAPS

RELATED APPLICATIONS

This non-provisional patent application claims priority to U.S. Provisional Patent Application No. 63/171,918 filed on Apr. 7, 2021, which is incorporated by reference as if fully provided herein.

TECHNICAL FIELD

The following disclosure relates to the field of fabrication, and in particular, to inspection and analysis during fabrication of parts.

BACKGROUND

Parts fabricated from a stackup of material, such as composite materials or metal, that are affixed together (e.g., via fasteners, epoxy, co-curing, or co-bonding) may exhibit gaps in their interface regions. These gaps may be particularly small, such as on the order of thousandths of an inch. However, even small gaps may be out of tolerance, depending on the intended field of use of the resulting part. For example, aerospace parts may have particularly tight tolerances. Hence, the filling of gaps with shims may be desirable.

Unfortunately, determining the size of a gap within an interface region remains complicated and time-consuming. In many instances, gaps are measured at each of multiple holes (e.g., fastener holes) that are drilled through an interface region (e.g., prior to installing fasteners in the holes). Visual inspection of the one or more gaps at each hole is therefore particularly time and manpower consuming in most circumstances, and there is little physical clearance for viewing the gap. Current techniques involve iteratively inserting "feeler" gauges, which measure gaps for filling with shims into a hole until an appropriate shim size is found to fill a gap. However, the process is notably time consuming and operator dependent, especially for parts such as barrel section joints of an aircraft fuselage that may include hundreds or thousands of holes for which measurement is desired.

Therefore, it would be desirable to have a method and apparatus that take into account at least some of the issues discussed above, as well as other possible issues.

SUMMARY

Embodiments described herein provide systems and methods for utilizing insertable probes that perform interferometry in order to determine the sizes of gaps between sheets of material ("interface gaps") within holes at a fabricated part. These techniques enable interface gap measurement to be performed reliably and automatically, and in a substantially shorter time period than prior manual measurement systems. Thus, a technical benefit in terms of increased time efficiency is achieved on the factory floor.

One embodiment is a method for measuring a hole. The method includes driving a fiber optic probe into the hole, determining a profile by scanning the hole via the fiber optic probe, and determining whether an interface gap exists at the hole based on the profile.

A further embodiment is an apparatus in the form of a hand tool for measuring a hole. The apparatus includes a fiber optic probe configured to scan the hole for gaps, an actuator configured to adjust a position of the fiber optic probe within the hole, and a control unit that detects an interface gap based on a data from the fiber optic probe.

A further embodiment is a method for measuring at a hole. The method includes inserting a sheathe of a hand tool through the hole, expanding a diameter of the sheathe until prongs disposed at the sheathe exceed a diameter of the hole, retracting the sheathe until the prongs do clamp the hand tool within the hole between a surface at a proximate end of the hole and a surface at a distal end of the hole, and driving a fiber optic probe of the hand tool into the hole.

Other illustrative embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

FIG. 11A depicts the presence of sealant and Foreign Object Debris (FOD) at an interface gap of a hole in an illustrative embodiment.

FIG. 12 is a flowchart illustrating a further method for operating a hole measurement system in an illustrative embodiment.

DESCRIPTION

The figures and the following description provide specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Various components described herein may be fabricated from composite parts and/or metallic parts. Composite parts, such as Carbon Fiber Reinforced Polymer (CFRP) parts, are initially laid-up in multiple layers that together are referred to as a preform. Individual fibers within each layer of the preform may be aligned parallel with each other, but different layers exhibit different fiber orientations in order to increase the strength of the resulting composite part along different dimensions. Furthermore, some layers may comprise woven fabric made from fibers. The preform includes a viscous resin that solidifies in order to harden the preform into a composite part (e.g., for use in an aircraft). Carbon fiber that has been impregnated with an uncured thermoset resin or a thermoplastic resin is referred to as "prepreg." Other types of carbon fiber include "dry fiber" which has not been impregnated with thermoset resin but may include a tackifier or binder. Dry fiber is infused with resin prior to hardening. For thermoset resins, the hardening is a one-way process referred to as curing, while for thermoplastic resins, the resin reaches a viscous form if it is re-heated, after which it can be consolidated to a desired shape and solidified. As used herein, the umbrella term for the process of transitioning a preform to a final hardened shape (i.e., transitioning a preform into a composite part) is referred to as "hardening," and this term encompasses both the curing of thermoset preforms and the forming/solidifying of thermoplastic preforms into a final desired shape.

Figure 1:
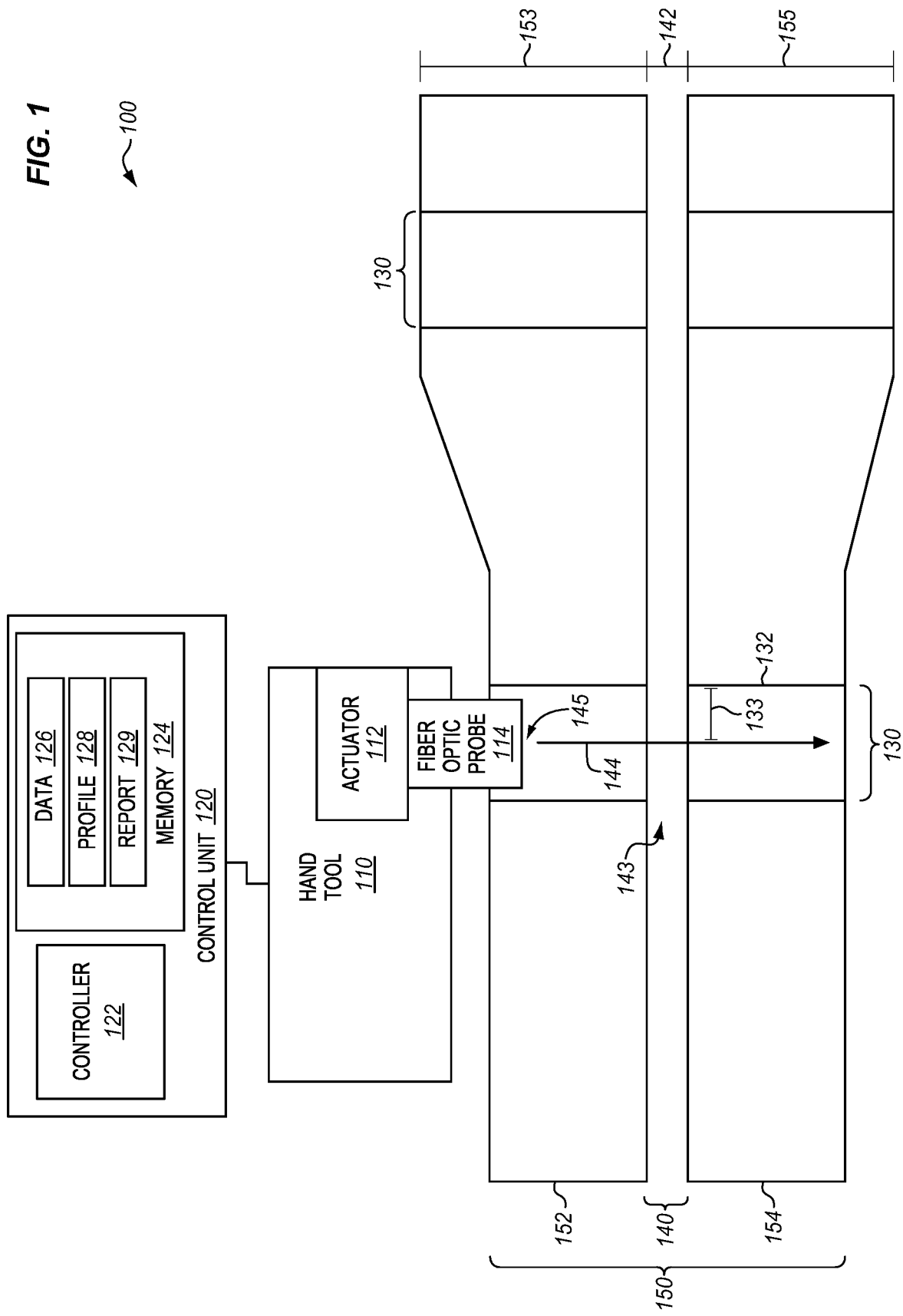
FIG. 1 illustrates a hole measurement system in an illustrative embodiment.

FIG. 1 illustrates a hole measurement system 100 in an illustrative embodiment. Hole measurement system 100 comprises any system, device, or component operable to inspect a hole 130 at a part 150 for one or more interface gaps 140. Depending on the part 150, there may be no interface gaps 140, or an arbitrary number of interface gaps 140. Furthermore, each interface gap 140 may be uniform in thickness or tapered within the purview of particular ones of hole 130. Each hole 130 may therefore have a different one of an interface gap 140 to measure.

Figure 15:
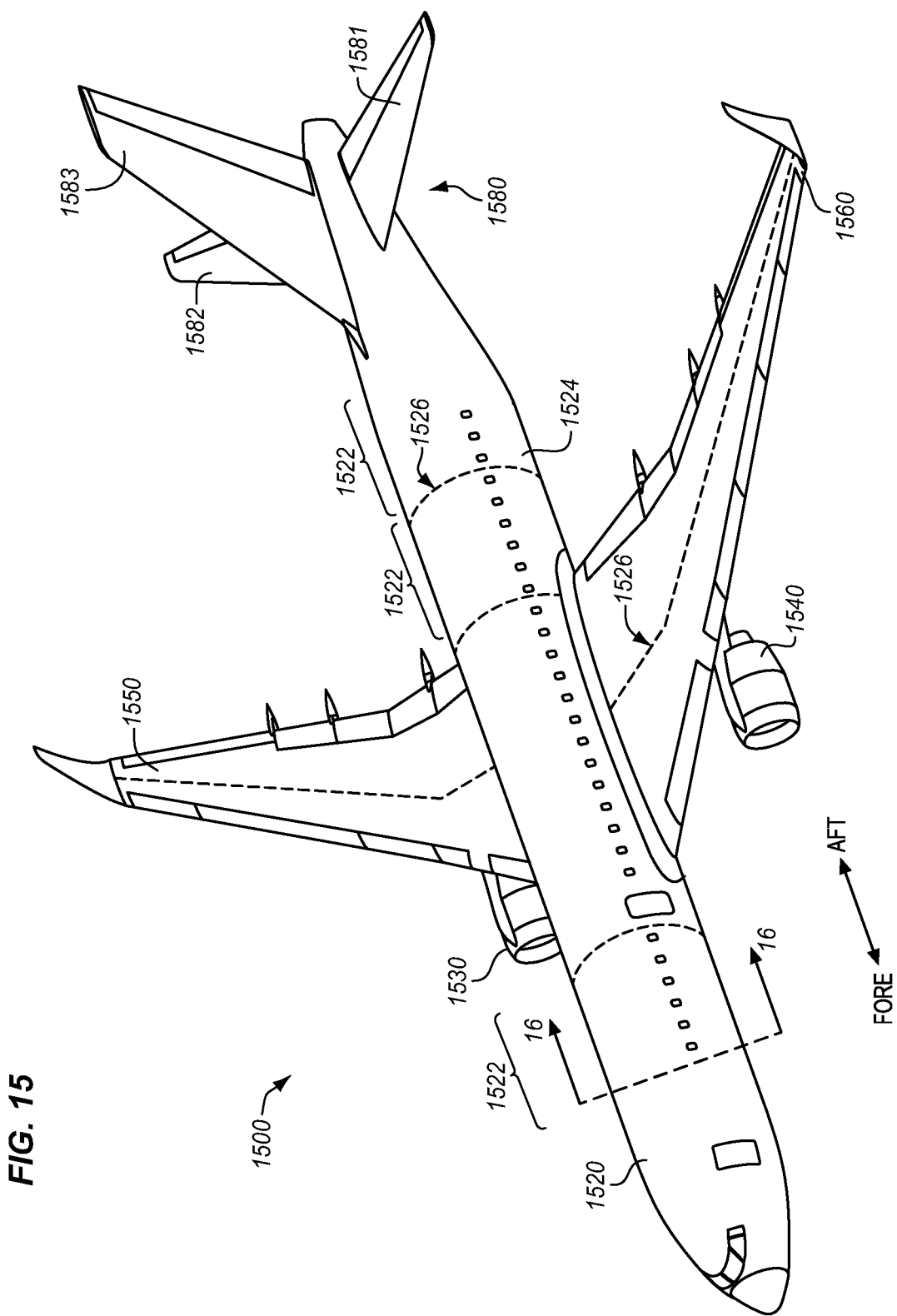
FIG. 15 depicts an aircraft in an illustrative embodiment.

As used herein, an interface gap 140 comprises any empty space at an interface 143 between one or more sheets 152 and 154. Sheets 152 and 154 may comprise metallic and/or composite materials. In one embodiment, the sheets 152 and/or 154 have varying thicknesses between holes 130 within the part 150. For example, the sheets 152 and/or 154 may have varying thicknesses 153 and 155 between holes 130 longitudinally such as at a part 150 for a barrel section 1522 (FIG. 15). In further embodiments fasteners (not shown) inserted into the hole 130 could also be used to splice upper half barrel sections (not shown) to lower half barrel sections (not shown). In such a process, three materials are joined, such as an upper half barrel section (not shown), a lower half barrel section (not shown), and a splice plate (not shown). In such an instance, a butt splice would be formed where only the splice plate joins the upper half barrel section to the lower half barrel section. Thus, the sections are sandwiched, and the splice plate forms a common joining element.

In this embodiment, hole measurement system 100 includes a hand tool 110 configured for operation by a technician. The hand tool 110 includes a fiber optic probe 114 that is used for Low-Coherence Interferometry (LCI), and an actuator 112 that is configured to adjust a one of depthwise positions 145 (i.e., a position along depth 144 of the hole 130) for the fiber optic probe 114. Distances 133 (e.g., to a wall 132 of the hole 130) are measured for each of multiple ones of depthwise positions 145. When a one of depthwise positions 145 of the interface gap 140 is reached, the distance 133 will measurably deviate from prior ones of distances 133 acquired at depthwise positions 145 for the wall 132. Thus, in one embodiment, if the distances 133 exceed expected values, the presence of an interface gap 140 is inferred.

A controller 122 is coupled with the hand tool 110. The controller 122 receives a data 126 from the fiber optic probe 114 for storage in memory 124. Memory 124 is configured to store a data 126 from the fiber optic probe 114. The data 126 may be utilized to generate a profile 128 of the hole 130. That is, in one embodiment the controller 122 is configured to determine a profile 128 of the hole 130 based on the data 126. Controller 122 identifies the presence of any interface gap 140 based on the profile 128, and generates a report 129 indicating a dimension 142 of the interface gap 140.

In one embodiment, the report 129 is based on distances 133 reported in the profile 128, and indicates the existence of, and characterizes, any interface gaps 140 discovered within the hole 130, should the interface gaps 140 exist. In one embodiment, controller 122 is implemented as custom circuitry, as a hardware processor executing programmed instructions stored in memory, or some combination thereof.

Illustrative details of the operation of hole measurement system 100 will be discussed with regard to FIG. 2. Assume, for this embodiment, that hand tool 110 has been placed at a hole 130 in preparation for measuring that hole 130.

Figure 2:
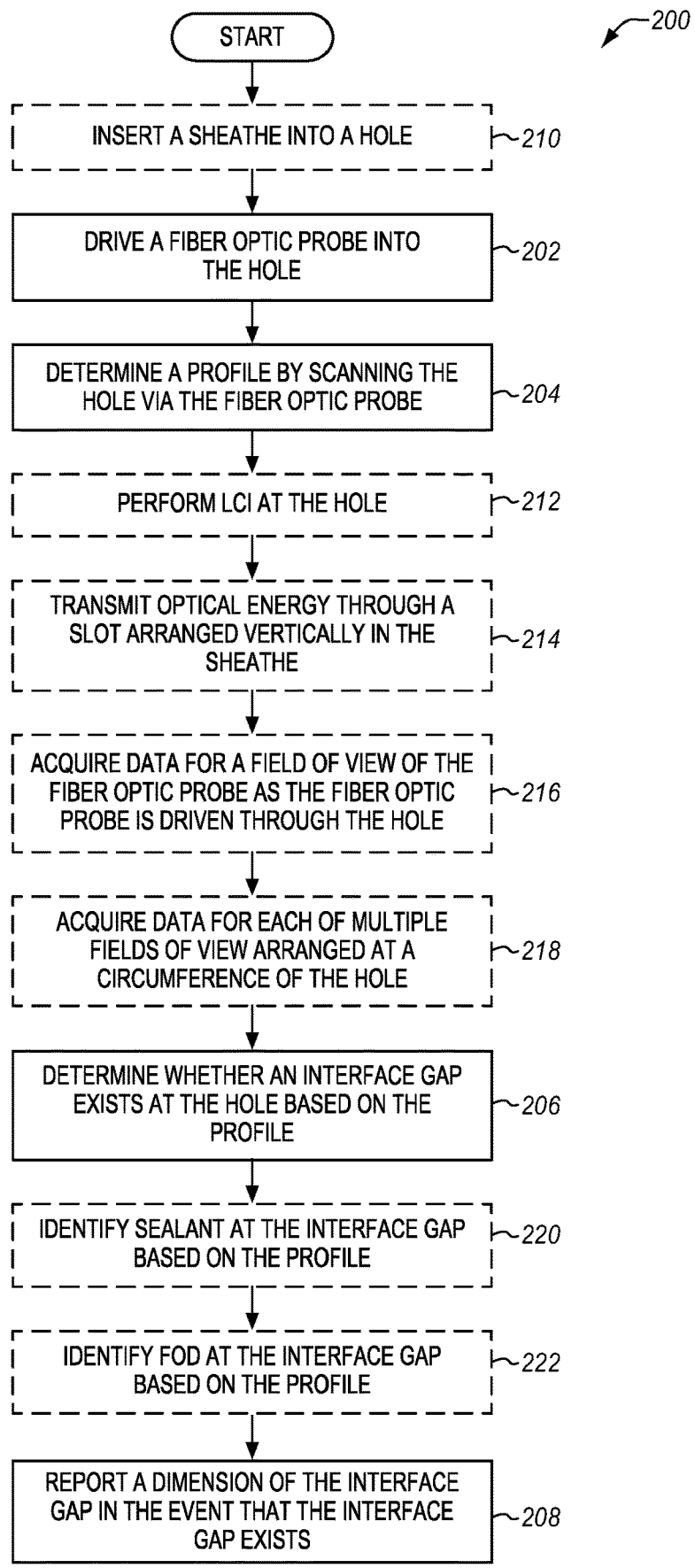
FIG. 2 is a flowchart illustrating a method for operating a hole measurement system in an illustrative embodiment.

FIG. 2 is a flowchart illustrating a method 200 for operating a hole measurement system in an illustrative embodiment. The steps of method 200 are described with reference to a hole measurement system 100 of FIG. 1, but those skilled in the art will appreciate that method 200 may be performed in other systems. The steps of the flowcharts described herein are not all inclusive and may include other steps not shown. The steps described herein may also be performed in an alternative order. Furthermore, the steps which are indicated with dashed lines are particularly optional.

Method 200 includes optionally inserting 210 a sheathe 470 (FIG. 4) into a hole 130. Method 200 further includes driving 202 a fiber optic probe 114 into the hole 130. Driving the fiber optic probe 114 refers to adjusting a one of depthwise positions 145 of the fiber optic probe 114 with respect to the hole 130. Thus, this operation may comprise increasing or decreasing a one of depthwise positions 145 of the fiber optic probe 114 within the hole 130, or even extending the fiber optic probe 114 through the hole 130. In one embodiment, driving of the fiber optic probe 114 is performed without the fiber optic probe 114 contacting or approaching a wall 132 of the hole 130. This beneficially protects the fiber optic probe 114 from being smeared by sealant, and/or from damage by contacting the walls 132 of the hole 130.

Method 200 further includes determining 204 a profile 128 by scanning the hole 130 via the fiber optic probe 114. Scanning the hole 130 may be performed by transmitting 214 optical energy 854 (FIG. 8) in order to optionally perform 212 Low-Coherence Interferometry (LCI) at the hole 130, or to perform other operations (e.g., Light Detection and Ranging (LIDAR)) to determine distances 133 to a wall 132 of the hole 130. As used herein, a "profile" refers to a series of measurements that describe distances 133 at depthwise positions 145 within the hole 130. Thus, a profile 128 may comprise a single set of measurements associated with different one of depthwise positions 145, may comprise an array of measurements, wherein groups of measurements correspond with different ones of depthwise positions 145, etc.

In further embodiments, method 200 also includes optionally acquiring 216 a data 126 for a field of view 1132 (FIG. 11B) of the fiber optic probe 114 as the fiber optic probe 114 is driven through the hole 130. The method 200 may further include optionally acquiring 218 data 126 for each of fields of view 1132, 1134, and 1136 (FIG. 11B) arranged at a circumference 1140 (FIG. 11B) of the hole 130.

Method 200 further includes determining 206 whether an interface gap 140 exists at the hole 130 based on the profile 128. Determining 206 the interface gap 140 based on the profile 128 may be performed by comparing expected measurements in the profile 128 to actual measurements in the profile 128. For example, if a profile 128 is expected to measure a set of distances 133 of one quarter inch, within a predefined tolerance, any distance 133 beyond that tolerance may be considered a portion of an interface gap 140. In a further embodiment, any distance 133 more than twice an expected amount, or any distance 133 greater than a threshold distance, is indicative of the presence of an interface gap 140 at a one of depthwise positions 145. Subsequent to identifying the one of depthwise positions 145 at which the interface gap 140 is present, controller 122 determines contiguous ones of depthwise positions 145 for which an interface gap 140 has been detected, enabling the rapid detection of a plurality of interface gaps 140 even within a hole 130. This information is utilized in one embodiment to determine a dimension 142 of the interface gap 140 with respect to the depth 144 of the hole 130. Thus, in this embodiment, the dimension 142 is measured along the depth 144 of the hole 130. Depending on the hole 130 being inspected, no interface gap 140 may exist. In such circumstances, controller 122 proceeds to forego the procedures at 206.

In further embodiments, method 200 includes optionally identifying 220 sealant 1110 at or in the interface gap 140 based on a region 1344 (FIG. 13) of the profile 128 that represents the interface gap 140, and/or optionally identifying 222 FOD 1120 at the interface gap 140 based on the profile 128.

Furthermore, method 200 includes reporting 208 a dimension 142 of the interface gap 140, in the event that the interface gap 140 exists. Reporting the dimension 142 of the interface gap 140 may comprise updating a display 1403 (FIG. 14) at the hole measurement system 100, generating an electronic message for transmission to an operator of the hand tool 110, or performing other functions.

Method 200 provides a technical benefit by substantially reducing the amount of labor and time involved in determining the dimension 142 of an interface gap 140 at a hole 130. By automatically detecting and measuring the dimensions 142 of any interface gaps 140 at a hole, the technician no longer needs to manually insert shims for the purpose of measuring the hole 130 before filling the hole 130 by installing a fastener (not shown).

With a discussion of the operations and components of an illustrative version of a hole measurement system 100 provided above, further FIGS. 3-10 depict various components of a further implementation of a hole measurement system 100. In this embodiment, a hand tool 110 comprises a body 316 having a case 315. The hand tool 110 also includes a barrel 310. The hand tool 110 is coupled via umbilicals 312 and 314 with a control unit 120 in the form of a cart 320. Thus, in this embodiment, the control unit 120 comprises a cart 320 that is coupled for communication with the hand tool 110 via an umbilical 314. In further embodiments, umbilicals 312 and/or 314 are foregone in place of pressure systems, power systems, and/or communication systems (not shown) that are internalized at the hand tool 110. For example, wireless communication technologies, such as protocols for wireless networking or Bluetooth communications, may be implemented to facilitate communications between the hand tool 110 and the control unit 120.

Coupling a hand tool 110 to a cart 320 via umbilicals 312 and 314 beneficially reduces the bulk of the hand tool 110, by enabling a server 1402 (FIG. 14), pressure system (e.g., compressed air line 1420 of FIG. 14), electrical power supply (e.g., power line 1410), and/or other components to be integrated into the cart 320.

Figure 3:
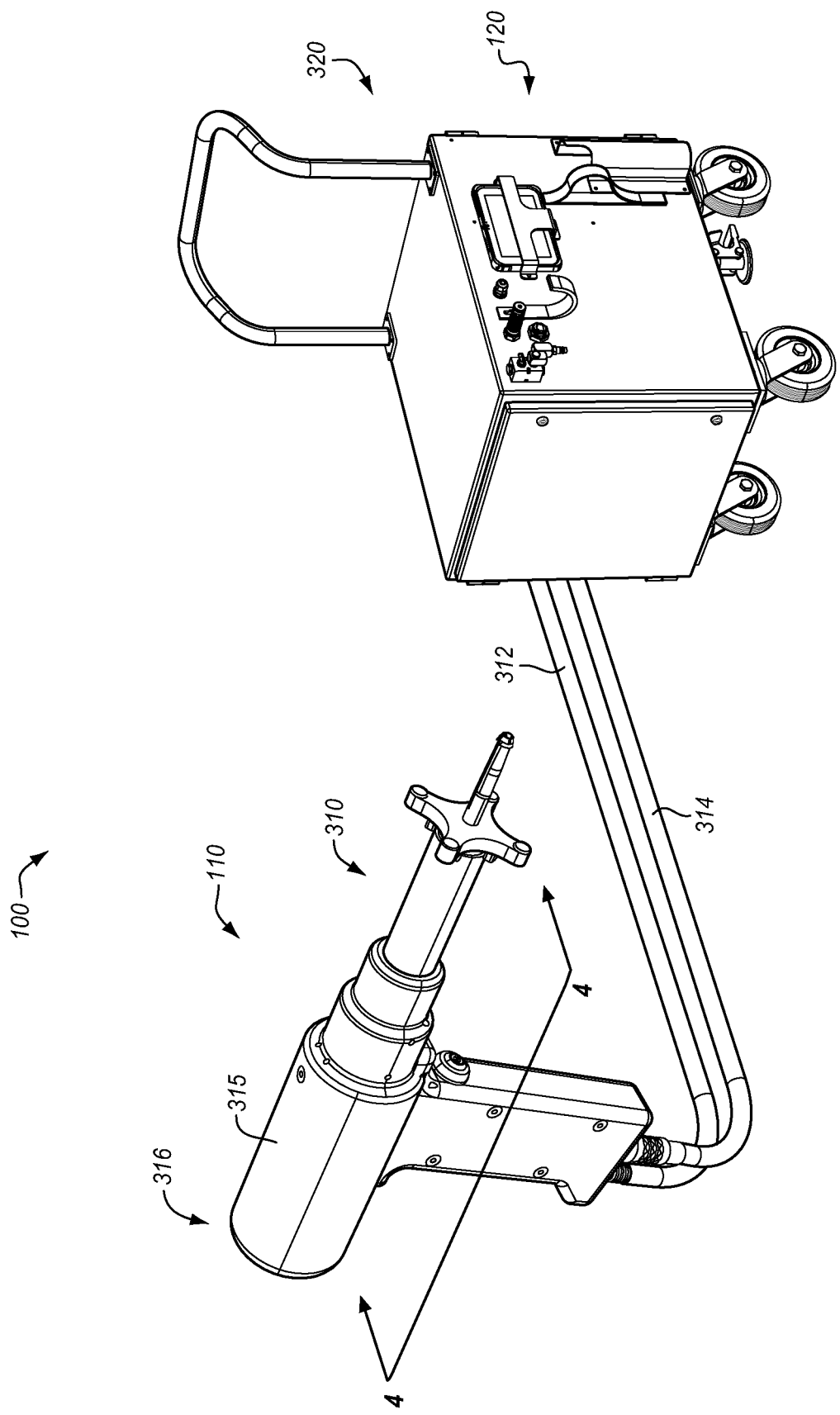
FIG. 3 depicts a further hole measurement system in an illustrative embodiment.
Figure 4:
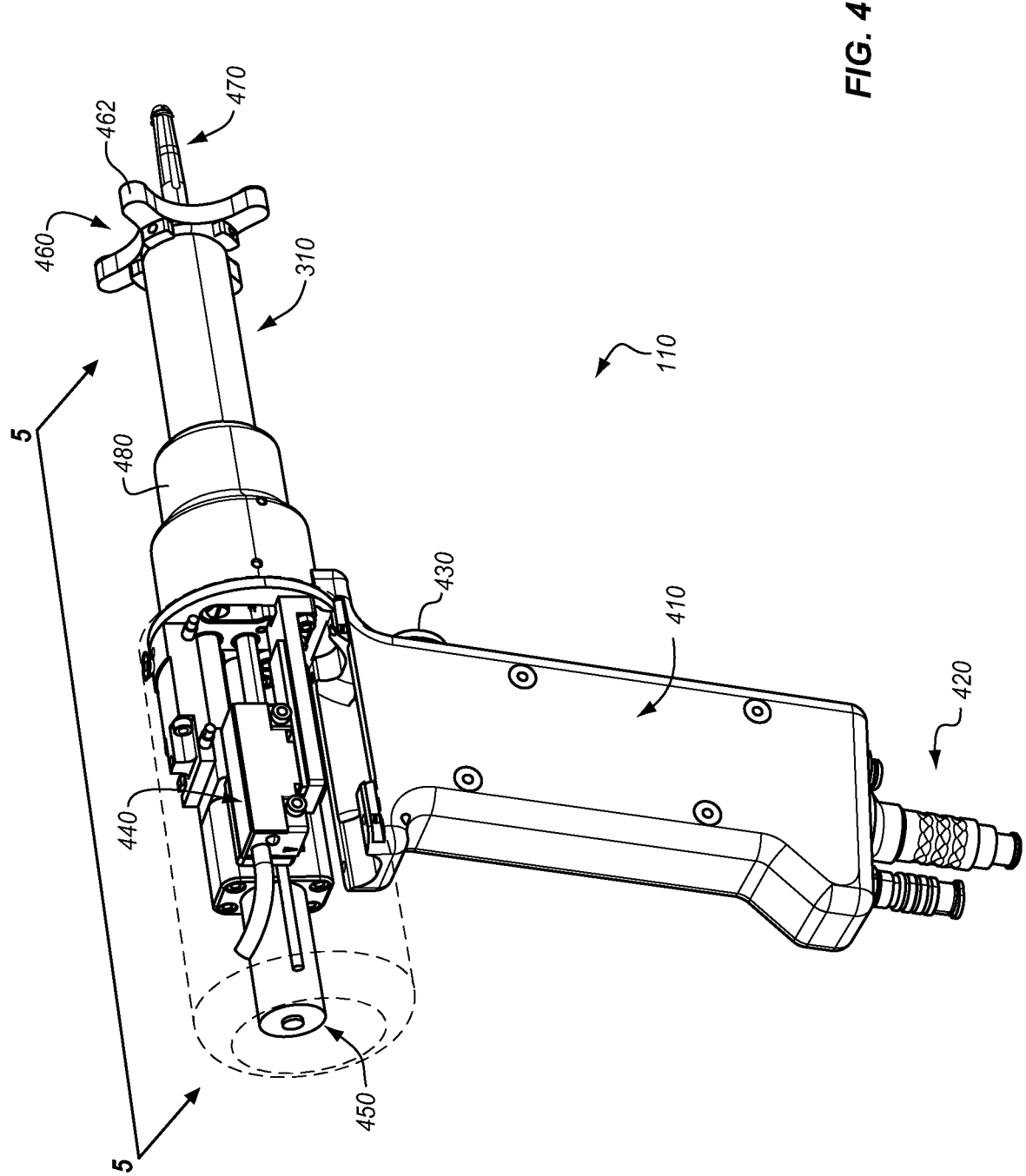
FIGS. 4-7 depict internal views of a hand tool of a hole measurement system in an illustrative embodiment.

FIG. 4 is an internal side view of hand tool 110, wherein case 315 has been removed. FIG. 4 corresponds with view arrows 4 of FIG. 3. In this view, handle 410 is visible, as is trigger 430 at the handle 410. Ports 420 for connecting to the umbilicals 312 and 314 of FIG. 3 are also depicted below the handle 410. An additional one of a case 480 (e.g., a housing) is also depicted.

Additional features of the hand tool 110 are visible in this view. Specifically, motor 450 is visible, as is scale 440. Motor 450 may comprise a linear actuator, worm drive, or other device configured to drive a fiber optic probe 114 at the hand tool 110 into a hole 130 at a part 150. Thus, the fiber optic probe 114 is effectively implemented as an end effector internal to the hand tool 110, that extends outward through the barrel 310. Scale 440 may comprise a magnetic tape scale or other measurement device that is configured to determine how far the fiber optic probe 114 has been extended or retracted by the motor 450.

The view of FIG. 4 further provides an enhanced level of detail depicting the barrel 310. Specifically, barrel 310 terminates at an endplate 460 having multiple feet 462. The feet 462 are dimensioned to be placed flush against a surface 816 (FIG. 8) of a part 150. The feet 462 are arranged to allow normal positioning of the hand tool 110 relative to the surface 816 through which the hole 130 is drilled. The feet 462 are also shaped to fit around the adjacent ones of holes 130 without interfering with holes 130 that are adjacent. A sheathe 470 is movable to extend beneath the endplate 460, and is dimensioned for insertion into a hole 130. Specifically, in one embodiment, sheathe 470 surrounds the fiber optic probe 114, and includes a slot 732 (of FIG. 7) that is arranged/proceeds axially relative to the barrel 310 and permits optical energy 854 (of FIG. 8) from the fiber optic probe 114 to reach a wall 132 of the hole 130. Depending on embodiment and a field of view 1132 (FIG. 11) of the fiber optic probe 114, the angle and/or size of the slot 732 may be adjusted to accommodate the field of view 1132. The optical energy 854 may then return to the fiber optic probe 114 and reach the control unit 120 (e.g., via a fiber optic line in an umbilical 312 and/or 314) for analysis.

Figure 5:
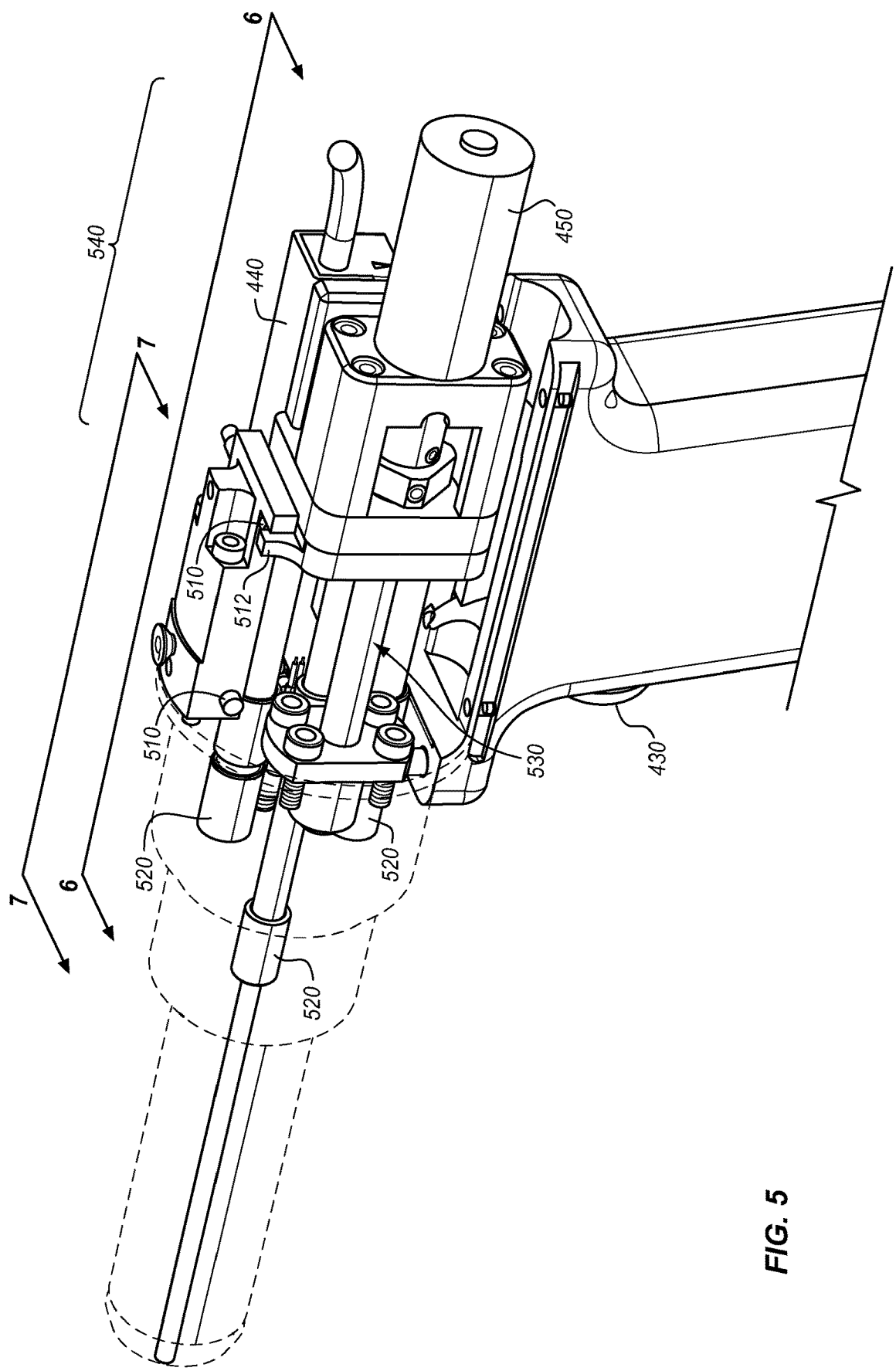

FIG. 5 is side view of internal structure at the hand tool 110, wherein case 480 (e.g., a housing) has been removed. FIG. 5 corresponds with view arrows 5 of FIG. 4. FIG. 5 illustrates an assembly 540 driven by motor 450 along ballscrew 530. The limits of motion of the assembly 540 are indicated by limit proximity switches 510, which detect the presence of prong 512 at the assembly 540 (e.g., via pressure, physical interaction, or other means), and provide signaling indicating whether the assembly 540 has reached a limit of extension or retraction. The assembly 540 is held in position during extension and retraction via guide bushings 520. Thus, in one embodiment, depth of insertion can be used to measure grip length for a hole 130.

Figure 6:
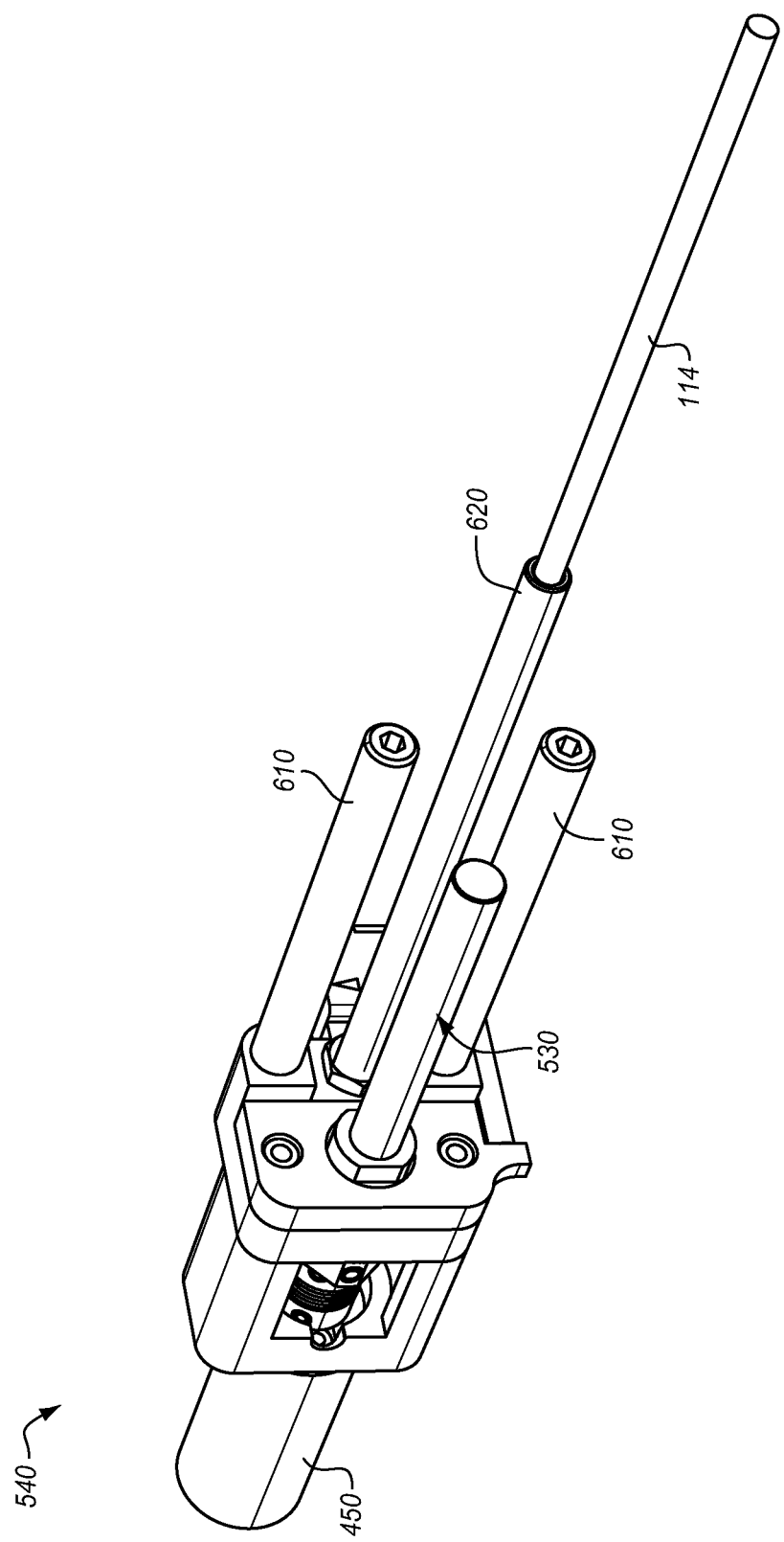

FIG. 6 is a view of assembly 540 as removed from hand tool 110. FIG. 6 corresponds with view arrows 6 of FIG. 5. Guide rods 610 interact with guide bushings 520 of FIG. 5 to prevent assembly 540 from rotating when extended or retracted. Guide rod 620 performs a similar function, and additionally houses a fiber optic probe 114 for detecting a distance 133 to a wall 132 of a hole 130.

Figure 7:
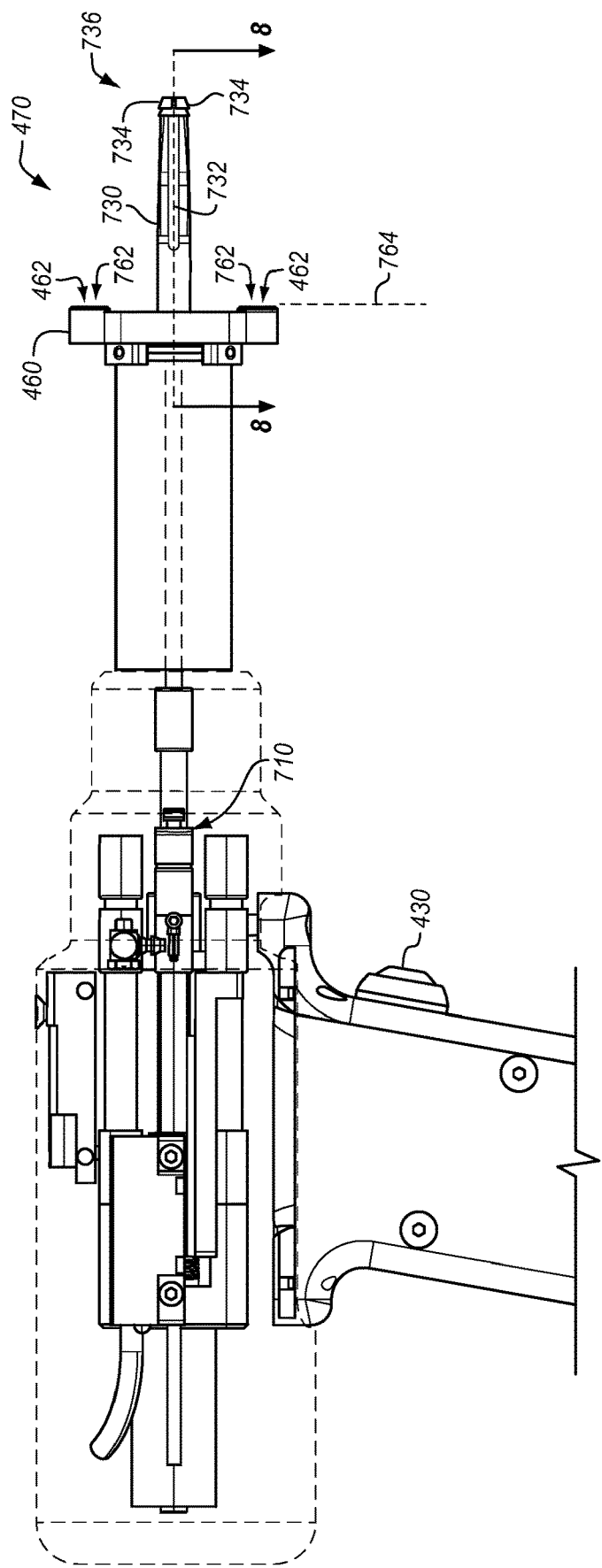

FIG. 7 is a further side view of internal structure of the hand tool 110. FIG. 7 corresponds with view arrows 7 of FIG. 5. In this view, endplate 460 and feet 462 are visible. Contact surfaces 762 of feet 462 are co-planar with plane 764 in this embodiment, but may be contoured in accordance with any suitable geometry in order to ensure that feet 462 are placed into contact with a surface 816 (FIG. 8) into which a hole 130 has been drilled. FIG. 7 also depicts a body 730 of the sheathe 470, which is configured for insertion into a hole 130. The sheathe 470 includes prongs 734 that are configured to grip a distal end 836 of the hole 130, for example, with a clamp-up force between five and ten pounds force, or more. For example, an automated system that foregoes a manual tool may potentially apply hundreds of pounds of force.

In this embodiment, the sheathe 470 includes slots 732, which permit optical energy 854 (FIG. 8) from a fiber optic probe 114 to be transmitted through the sheathe 470. The slots 732 further permit for a tip 736 of the sheathe 470 to be expanded and retracted in diameter in response to applied forces. That is, just like the slot of a clothespin, the fact that the slots 732 proceed all the way to the tip 736 enables the prongs 734 to separate and deflect from each other. This enables prongs 734 at the tip 736 to extend beyond a diameter 832 (FIG. 8) of a hole 130. The sheathe 470 is retractable relative to endplate 460. When sheathe 470 is retracted, its prongs 734 are wider than a diameter 832 (FIG. 8) of the hole 130. When sheathe 470 is extended, its prongs 734 are less wide than a diameter 832 (FIG. 8) of the hole 130. By extending sheathe 470, sheathe 470 may be inserted through a hole 130. By retracting sheathe 470, prongs 734 are dimensioned for gripping a distal end 836 (FIG. 8) of the hole 130. This enables gripping of the hole 130 during measurement of the hole 130, and further permits the use of hand tool 110 to grip and measure the holes 130 having a variety of depths. Still further, the gripping of the hole 130 also ensures that the feet 462 fully engage a surface 816 (FIG. 8) to make the hand tool 110 normal to the surface 816. This also ensures that the hand tool 110 does not move relative to the hole 130 while a scan is occurring. Still further, this feature allows the control unit 120 to measure a grip length of the hole 130, which is particularly useful in determining the size of a fastener (not shown) to install into the hole 130, and may also indicate whether an interface gap 140 of excessive size exists in the hole 130 (e.g., if a grip length is significantly greater than expected).

Still further, when prongs 734 grip the distal end 836 by clamping to surface 817, this enables a grip length 839 (FIG. 8) for each of the holes to be measured, by measuring between the prongs 734 and the contact surface 762 of the endplate 460. Grip length 839 may be important when deciding upon a fastener size (not shown) to install into the hole 130. FIG. 7 further depicts a solenoid valve 710, which may be selectively activated to permit the flow of pneumatic pressure 1422 (FIG. 14) into barrel 310.

Figure 8:
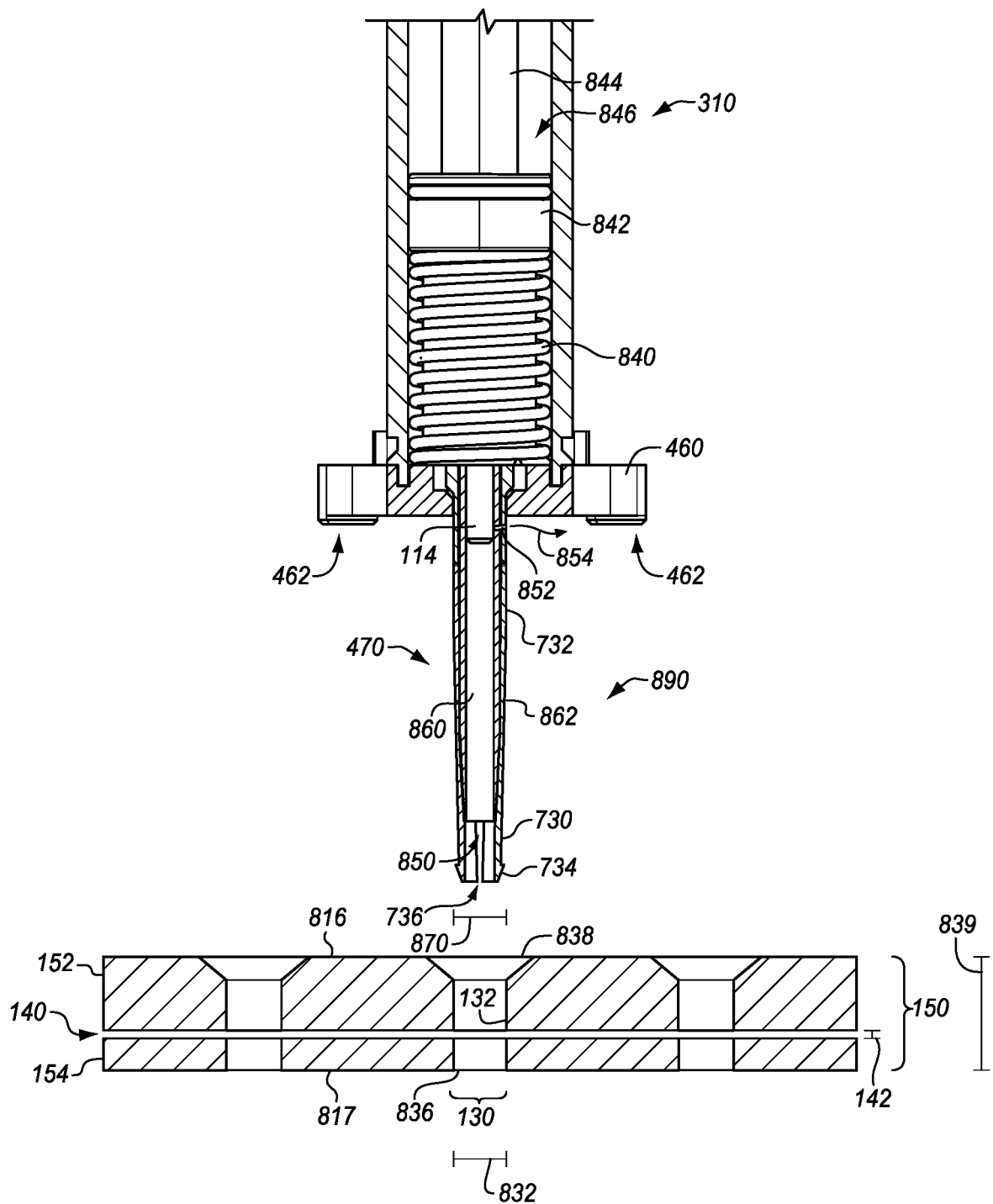
FIGS. 8-10 are section cut diagrams that depict a hand tool interacting with a hole in an illustrative embodiment.
Figure 9:
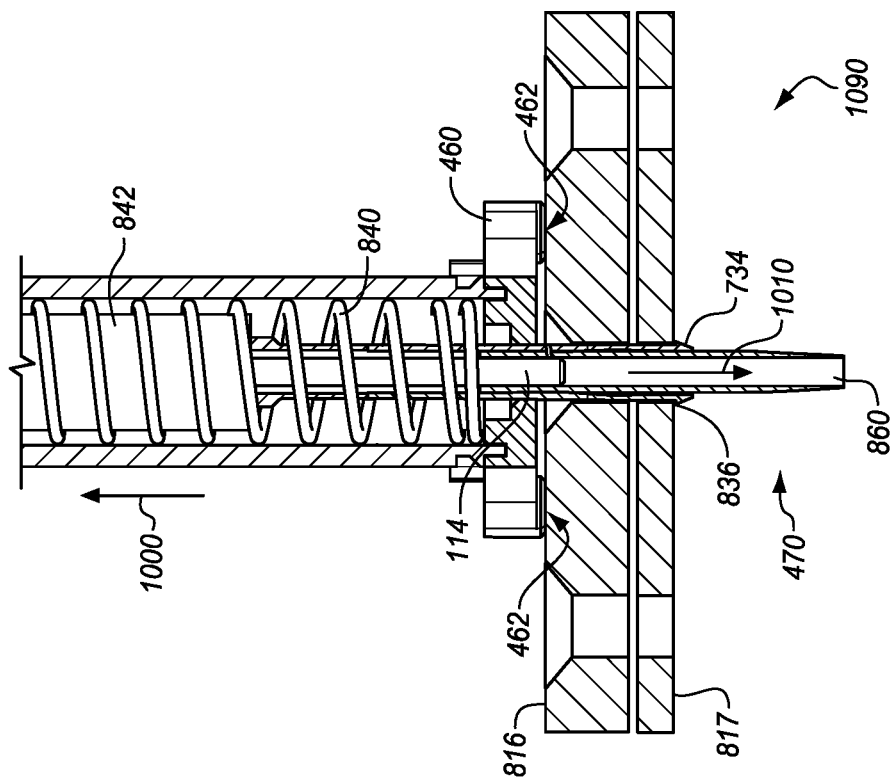
Figure 10:
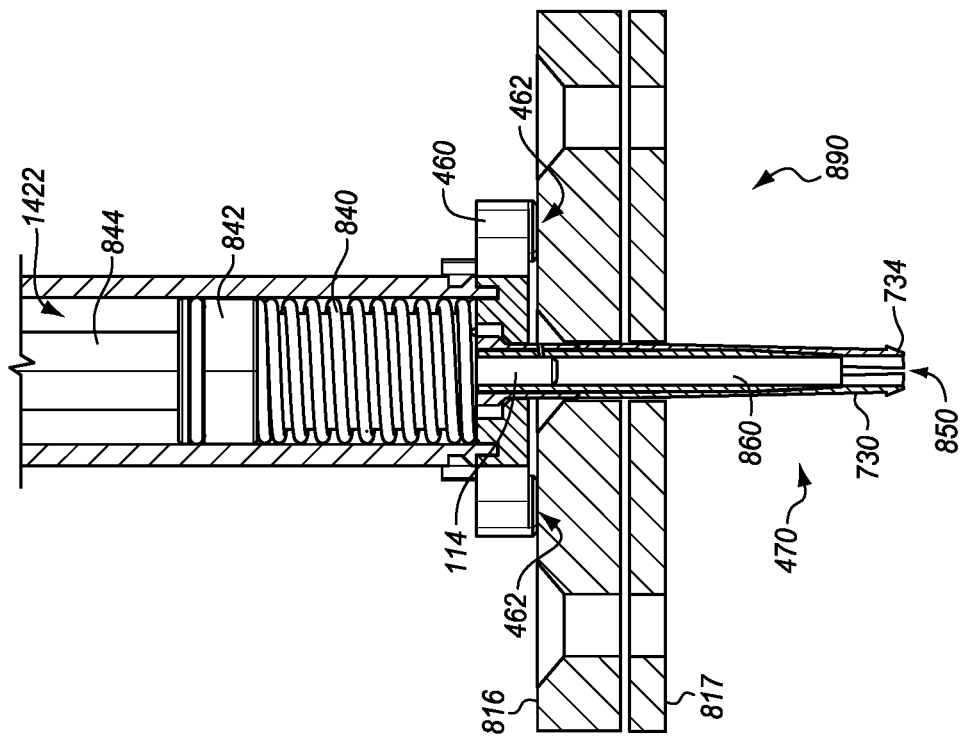

With a discussion of a hand tool 110 provided above, discussion of operation of the hand tool 110 during measurement of a hole 130 will be provided with regard to FIGS. 8-10. FIGS. 8-10 are section cut diagrams that depict a hand tool 110 interacting with a hole 130 in an illustrative embodiment, and correspond with view arrows 8 of FIG. 7. In FIG. 8, sheathe 470 is poised over a hole 130. The hole 130 is drilled through a surface 816 of part 150 comprising a sheet 152 and a sheet 154, which are affixed to each other, but separated by an interface gap 140. Hole 130 includes a proximate end 838 which receives the sheathe 470, and a distal end 836 through which the sheathe 470 exits the hole 130 and grips the distal end 836.

Sheathe 470 is coupled to piston 842, which circumscribes the rod 844 within an interior 846 of the barrel 310. Rod 844 is fixed in position within the barrel 310, and piston 842 is biased by a biasing element 840 (e.g., a spring) upwards, which holds sheathe 470 in a retracted position (e.g., retracted position 1090 of FIG. 10). Trigger 430 is configured to activate a piston 842 (of FIG. 8) that retracts the sheathe 470. Specifically, when trigger 430 is pulled, pneumatic pressure 1422 (FIG. 14) within an enclosed volume defined by the barrel 310 drives piston 842 downwards and compresses the biasing element 840, to place the sheathe 470 into an extended position 890. Thus, by pressing the trigger 430, sheathe 470 may be extended into the hole 130. After the trigger is released, the sheathe 470 is retracted by the biasing element 840 as the biasing element 840 returns to rest. This causes the sheathe 470 to grip the hole 130 via prongs 734.

Within an interior 850 of the sheathe 470 is a bushing 860. Bushing 860 is configured to increase a diameter 870 of the sheathe 470. When the sheathe 470 is extended as shown in FIG. 8, the bushing 860 does not elastically deform the tip 736 of the sheathe 470. Thus, a diameter 870 of the tip 736 remains less than a diameter 832 of the hole 130. This difference in diameters between hole 130 and sheathe 470 (i.e., while the sheathe 470 is tapered and before the tip 736 is elastically deformed by the bushing 860) permits insertion of sheathe 470 into the hole 130. Furthermore, the fact that the sheathe 470 is tapered along its length facilitates insertion of the sheathe 470 into the hole 130. When sheathe 470 is retracted, bushing 860 elastically deforms the sheathe 470, increasing diameter 870 to greater than diameter 832. This causes prongs 734 to grip the distal end 836 of the hole 130, securing the hand tool 110 in place.

FIG. 8 further depicts an emitter 852 at the fiber optic probe 114. The emitter 852 may comprise an end of the fiber optic probe 114 that emits the optical energy 854. The optical energy 854 is capable of exiting the sheathe 470 because slots 732 at the sheathe and slots 862 at the bushing 860 align with emitter 852. Effectively, slots 732 facilitate anchoring the hand tool 110 by extending the prongs 734, while slots 862 operate as windows that enable optical energy 854 to pass from the fiber optic probe 114 to the wall 132 of the hole 130. Hence, sheathe 470 and bushing 860 do not interfere with the passage of the optical energy 854 from the fiber optic probe 114 to the wall 132 of the hole 130, even though the fiber optic probe 114 travels within the sheathe 470 and the bushing 860 as part of the scanning process.

In FIG. 9, sheathe 470 has been extended through the hole 130 while in the extended position 890 by the operation of pneumatic pressure 1422 (FIG. 14) upon the piston 842. This enables the prongs 734 of the sheathe 470 to travel through the hole 130. In FIG. 10, the pneumatic pressure 1422 (FIG. 14) is released, causing piston 842 to move upwards in direction 1000. This retracts the sheathe 470, causing the prongs 734 to spread outward and grip the distal end 836 of the hole 130 as sheathe 470 slides over bushing 860. That is, force pulling the prongs 734 against the hole are responded to by endplate 460, which clamps the hand tool 110 within the hole 130. At this point in time, fiber optic probe 114 has not yet extended, and remains poised in position close to the endplate 460.

While the sheathe 470 is retracted, fiber optic probe 114 is held in position to extend through the hole 130 without contacting the hole. During extension and retraction of the fiber optic probe 114, body 730 of sheathe 470 prevents the fiber optic probe 114 from touching the walls 132 and/or contacting sealant or other Foreign Object Debris (FOD) at the hole 130. Thus, operation of motor 450 of FIG. 4 drives assembly 540 of FIG. 5 (and hence fiber optic probe 114) downwards in direction 1010. The fiber optic probe 114 performs LCI scanning of the hole as it is extended and/or retracted by the motor 450, in order to acquire a profile 128 that measures distance to a wall 132 of the hole 130 across a variety of depthwise positions 145. Specifically, the fiber optic probe 114 operates as a conduit for optical energy 854 such as a fiber optic line, and this optical energy 854 proceeds to and from a control unit 120 (e.g., via one or more of umbilicals 312 and/or 314) for measurement and analysis by the control unit 120.

FIG. 11A depicts the presence of sealant 1110 and 1112, as well as Foreign Object Debris (FOD) such as FOD 1120 and FOD 1122 at an interface gap 140 of a hole 130 in an illustrative embodiment. FIG. 11A makes clear that elements such as FOD 1120 and sealant 1110 and 1112 may partially obstruct an interface gap 140. Understanding where sealant 1110 and 1112 are disposed within the interface gap 140, if at all, facilitates the process of deciding whether a shim is needed for the interface gap 140, and if so, what size. Hence, interferometry may be performed via a fiber optic probe 114 to acquire a surface map (not shown) within the hole 130 in order to detect these conditions. Furthermore, such techniques may be utilized to detect the presence of FOD 1122 external to the hole 130, such as at a proximate end 838 or distal end 836. Specifically, if distances determined via interferometry are shorter than expected (e.g., shorter than detection limits) beyond a distal end 836 of the hole 130, this indicates that FOD 1122 is present.

Figure 11B:
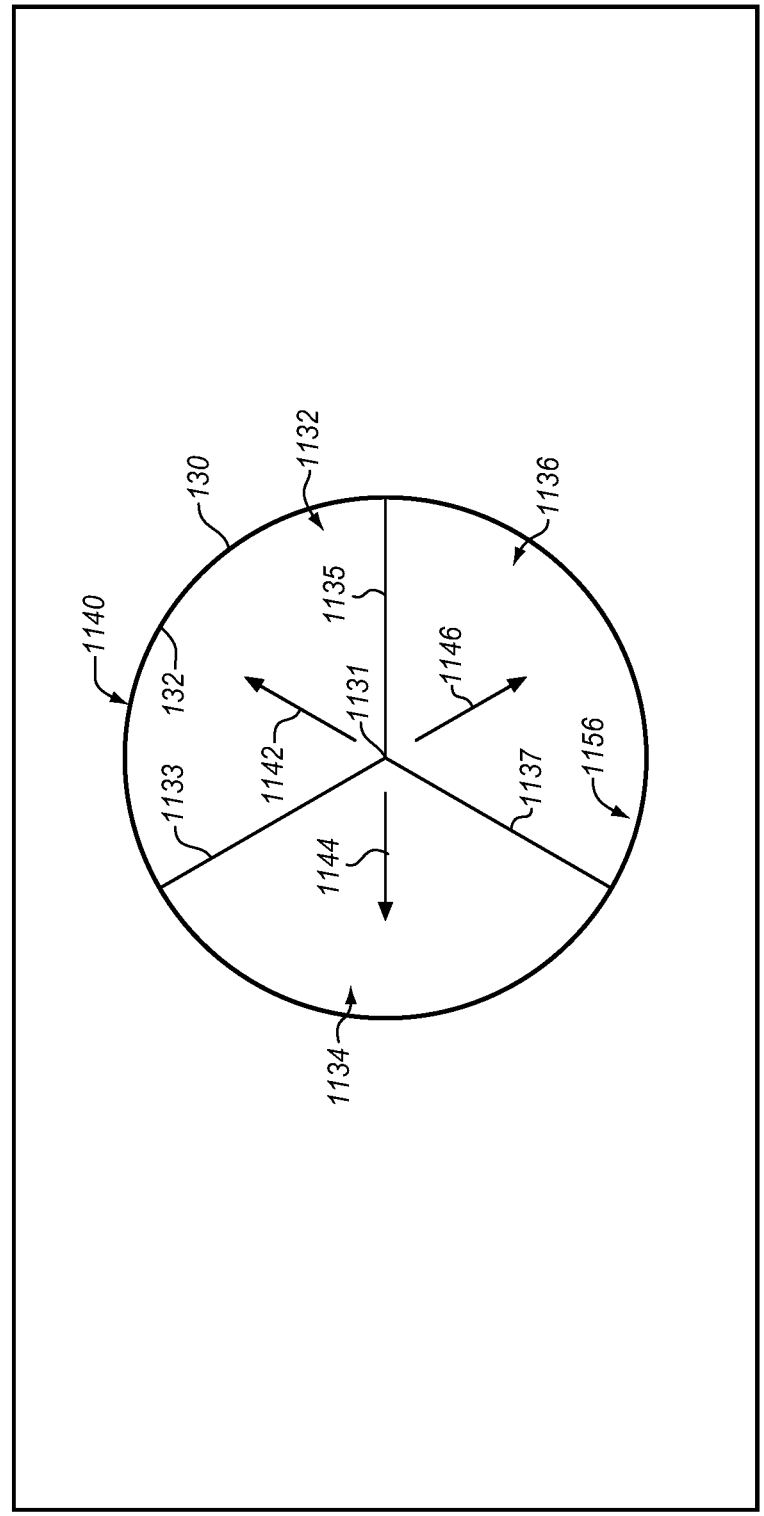
FIG. 11B depicts fields of view of a fiber optic probe inserted into a hole in an illustrative embodiment.

FIG. 11B depicts fields of view 1132, 1134, and 1136 of a fiber optic probe 114 inserted into a hole 130 in an illustrative embodiment. The fields of view 1132, 1134, and 1136 each correspond with a circumferential portion 1156 of a wall 132 of the hole 130, as viewed from a fiber optic probe 114 disposed at a center 1131 of the hole 130, and are each one hundred and twenty degrees. The fields of view 1132, 1134, and 1136 may be any suitable number of degrees, such as ninety, one hundred and twenty degrees, or one hundred and eighty, depending on a geometry of the fiber optic probe 114, slots 732 and/or slots 862. The fields of view 1132, 1134, and 1136 end at boundaries 1133, 1135, and 1137. In one embodiment, the dimension 142 of the interface gap 140, if any, is not known exactly until hand tool 110 is used to measure the interface gap 140. The interface gap 140 may not be uniform over the circumference 1140 of the hole 130. Thus, the interface gap 140 could be tapered in one circumferential portion 1156 of the hole 130 but may be thicker in another. The taper may be from thicker to thinner or vice versa). Therefore, if a field of view 1132 is acquired in a first scan by extending and retracting a fiber optic probe 114, additional scans may be required, by rotating the hand tool 110, and extending and retracting the fiber optic probe 114 again to acquire data for another of circumferential portions 1156. In one embodiment, the sums of the fields of view 1132, 1134, and 1136 of the scans do not have to add up to a full three hundred and sixty degrees for each of hole 130. Thus, an operator may strategically select locations/angles for the field of view 1132 for each scan. A field of view 1132 may even overlap with prior ones of fields of view 1134 and 1136 for a hole 130, if desired by the operator.

By performing multiple extensions and retractions of the fiber optic probe 114 while pointed in different directions 1142, 1144, and 1146, a series of profiles 128 and/or surface maps (not shown) may be acquired for a hole 130. The profiles 128 may be generated based on analysis of signals and/or data received at a controller 122 of the control unit 120 from the hand tool 110, such as optical energy 854 received via fiber optic probe 114. These profiles 128, and/or analyses thereof, may then be presented to the operator of the hand tool 110 via control unit 120, such as by presenting the profile 1300 of FIG. 13

FIG. 12 is a flowchart illustrating a further method 1200 for operating a hole measurement system 100 to measure a hole 130 in an illustrative embodiment. Method 1200 includes inserting 1202 a sheathe 470 of a hand tool 110 through the hole 130. This operation may be performed by pressing the trigger 430 in order to cause the pneumatic pressure 1422 (FIG. 14) to drive the piston 842 to extend the sheathe 470, and then pushing sheathe 470 into the hole 130. In one embodiment, pressing the trigger 430 sends a control signal to the control unit 120, which causes pneumatic pressure 1422 (FIG. 14) to be applied via umbilical 314 and/or umbilical 312. The pressure is transferred to an interior 846 of the barrel 310, which drives the piston 842. The driving of piston 842 extends the sheathe 470.

The method 1200 further includes expanding 1204 a diameter 870 of the sheathe 470 until prongs 734 disposed at the sheathe 470 exceed a diameter 832 of the hole 130. In this embodiment, this comprises retracting sheathe 470, which causes prongs 734 to slide along bushing 860 and spread apart while the prongs 734 disposed beyond the distal end 836 of the hole 130 (i.e., entirely through the hole 130).

The method 1200 also includes retracting 1206 the sheathe 470 until the prongs 734 do clamp the hand tool 110 within the hole 130 between surface 816 at the proximate end 838 of the hole 130 and the surface 817 at the distal end 836 of the hole 130. For example, when the trigger 430 is released, or a set period of time after pressing the trigger 430, the piston 842 returns. Thus, hand tool 110 is clamped into place by sandwiching the distal end 836 and the proximate end 838 of the hole 130 while the sheathe 470 is extended through the through the hole 130. Thus, in some embodiments, an Outer Mold Line (OML) defined by surface 816 and an Inner Mold Line (IML) defined by surface 817 surrounding the hole 130 are clamped to the hand tool 110. In one embodiment, expanding and retracting are performed via the same operation, while in other embodiments, these are separately performed operations.

The method further includes driving 1208 a fiber optic probe 114 of the hand tool 110 into the hole 130. In one embodiment, this comprises pressing a button (not shown) at the control unit 120 that causes the control unit 120 to activate the motor 450 of the hand tool 110. Activation of the motor 450 extends and then retracts the fiber optic probe 114. That is, the driving of the fiber optic probe 114 is automatically controlled by controller 122 at a desired rate of plungering, for example based on Numerical Control (NC) program instructions in memory 124. Hence, the fiber optic probe 114 is capable of being reliably and predictably extended in a uniform manner, regardless of the hole 130 that is being measured. Note that the extension of the fiber optic probe 114, being performed by motor 450, is a separate process from the clamping action performed by the piston 842 in response to pneumatic pressure 1422. In further embodiments, a rate of extension ("plungering") of the fiber optic probe 114 is adjustable by the control unit 120 and/or a technician as desired. In some embodiments, the rate of extension may even be adjusted in real time, such as in order to inspect certain ranges of depthwise positions 145 with greater scrutiny. In still further embodiments, at certain predefined and/or dynamically determined ones of depthwise positions 145, the fiber optic probe 114 pans/rotates to scan a larger field of view, or multiple fields of view. This may facilitate scanning a particular feature that surrounds the fiber optic probe 114.

Additionally, the method 1200 includes determining 1210 whether an interface gap 140 exists at the hole 130 by scanning the hole 130 via the fiber optic probe 114 as the fiber optic probe 114 is driven into the hole 130. In one embodiment, this comprises optionally activating 1212 the fiber optic probe 114 to transmit optical energy 854 through a slot 732 that is axially arranged at the sheathe 470. This operation may further comprise optionally performing 1214 interferometry, such as performing LCI at the hole 130, to determine distances 133 measured by the fiber optic probe 114 at a one of depthwise positions 145 that varies. In such embodiments, optical energy 854 travels and is reflected off of walls 132 in the hole 130. The optical energy 854 then returns to the fiber optic probe 114 (e.g., a fiber optic line) and continues via one or more of umbilicals 312 and 314 until reaching the control unit 120. Measurements of the optical energy 854 received at the control unit 120, in accordance with LCI techniques, may then be utilized to measure the distances 133 of FIG. 1. By correlating measured ones of distances 133 to depthwise positions 145 based in input from motor 450, a profile 128 of depthwise positions 145 and distances 133 is created.

Steps 1208-1210 may be repeated any suitable number of times with the fiber optic probe 114 pointed in any suitable directions in order to acquire multiple profiles of the hole 130. For example, steps 1208-1210 may be repeated for each descent and/or retraction of the fiber optic probe 114 within the hole 130. Thus, it is potentially possible to descend with one field of view 1132 and then turn or rotate the fiber optic probe 114 relative to the hole 130 to scan a field of view 1134 during retraction up through the hole 130.

In further embodiments, method 1200 includes reporting, at step 1216, a dimension 142 of the interface gap 140 via a control unit 120 coupled with the hand tool 110 such as by updating a display (e.g., display 1403 of FIG. 14) at the control unit 120. In one embodiment, this comprises displaying a dimension 142 of the interface gap 140 textually or visually via a screen at the control unit 120. In a further embodiment, this comprises displaying the depthwise positions 145 which form the boundaries of the interface gap, via the screen. Additional operations may include optionally identifying, at step 1218, sealant 1110 at the interface gap 140, and optionally identifying 1220 the existence of Foreign Object Debris (FOD) such as FOD 1120 at the interface gap 140. For example, thresholding may be performed for distances 133 in order to infer the presence of such elements. If a distance 133 is beyond a threshold amount, this may be indicative of the presence of sealant 1110 or FOD 1120. These operations may be performed based on a comparison between actual and expected distances, as will be described with regard to FIG. 13 below.

Figure 13:
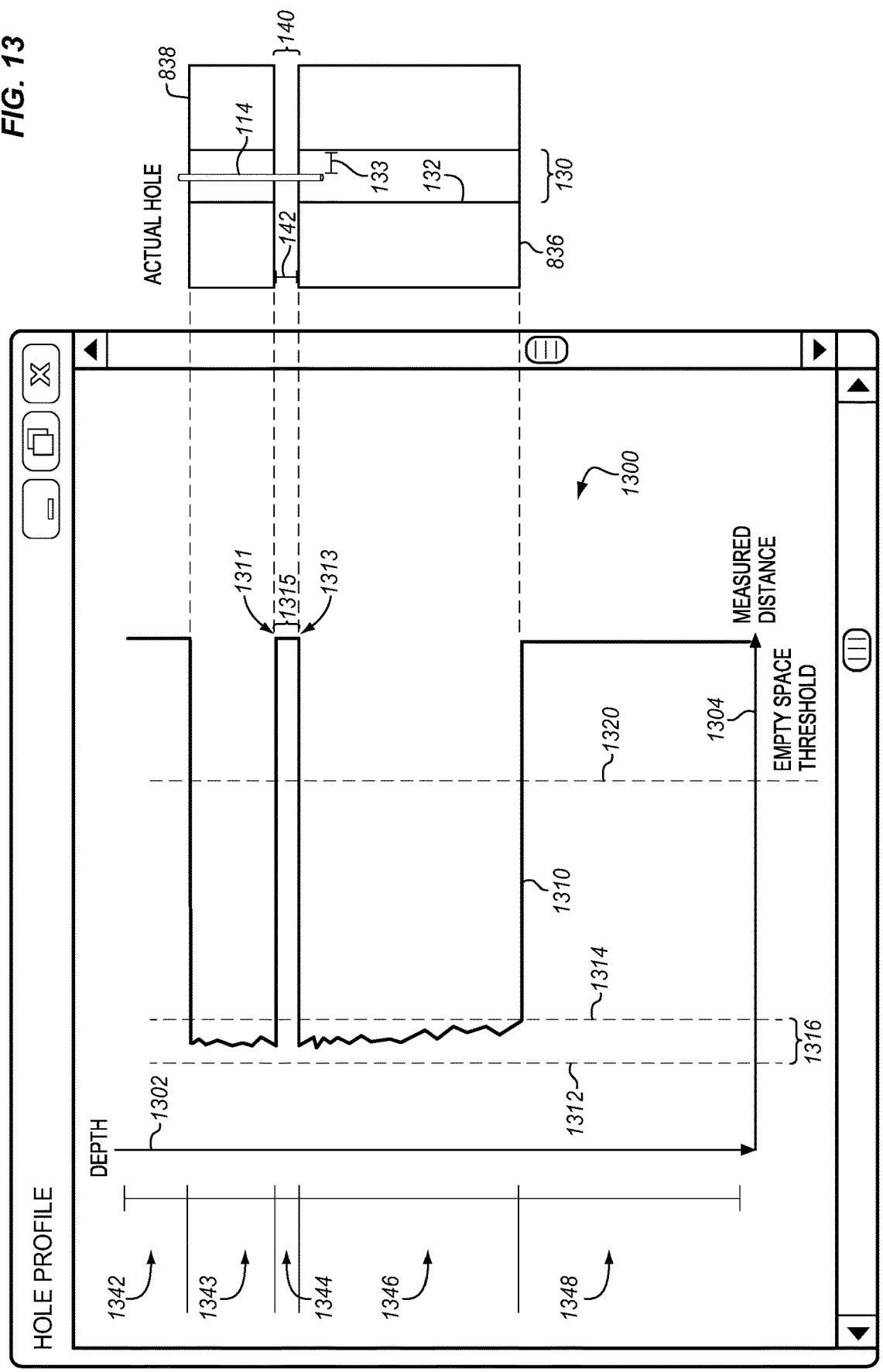
FIG. 13 depicts a profile generated based on input from a fiber optic probe in an illustrative embodiment.

FIG. 13 depicts a profile 1300 generated based on input from a fiber optic probe 114 in an illustrative embodiment. Depending on embodiment, a profile 1300 may be presented via a control unit 120 or may be transmitted to a handheld device of a technician, or may be foregone such that only a measurement of interface gap 140 is provided. For example, profiles 1300, distances 133, and/or real-time images generated based on input from the fiber optic probe 114 may be provided to an operator for review, such as via a feedback device or monitor (not shown).

Profile 1300 includes measurements 1310 of distance 133 acquired at depthwise positions 145 as a fiber optic probe 114 travels along a hole 130. Distances 133 are determined based on interferometry, while a one of depthwise positions 145 is determined based on input from scale 440 of FIG. 4. In this embodiment, a one of depthwise positions 145 into the hole 130 increases in the downward direction 1302, and measured distance increases in the rightward direction 1304. Measurements 1310 beyond threshold 1320 indicate distances 133 beyond a detection range of the fiber optic probe 114.

During operation, the fiber optic probe 114 is expected to proceed through a region 1342 prior to a proximate end 838 of the hole 130, then to enter a region 1343 within the hole 130, then to encounter one or more of regions 1344 indicative of an interface gap 140, followed by one or more regions 1346 within the hole 130, and finally to exit the hole 130 into a region 1348 beyond a distal end 836 of the hole 130. Although the fiber optic probe 114 exits the distal end 836 of the hole 130 in this embodiment, in further embodiments this action is not required.

Based on this knowledge, measurements 1310 are expected to start beyond the threshold 1320, prior to the fiber optic probe 114 entering the hole 130. Then, measurements 1310 are expected to be within a region 1316 bounded by thresholds 1312 and 1314. These thresholds 1312 and 1314 represent expected distances 133 to reach a wall 132 of the hole 130. If the measurements 1310 are outside of the region 1316, but not beyond threshold 1320, this indicates the existence of FOD 1120 and/or sealant 1110 at the hole. Alternatively, if measurements 1310 are beyond threshold 1320 after they have been measured within region 1316, this indicates the presence of an interface gap 140. One or more interface gaps 140 may be detected in this manner, separated by one or more regions 1346 indicative of walls of the hole 130. A controller 122 measures a dimension 142 of each interface gap 140 by determining a difference in depth between a first measurement 1311 beyond the threshold 1320 and a last measurement 1313 (in a series of measurements 1315) beyond the threshold 1320. Finally, the detection of a measurement 1310 beyond the threshold 1320, which is not followed by detection of a measurement 1310 less than the threshold 1320, corresponds with the fiber optic probe 114 having reached beyond a distal end 836 of the hole 130, without detecting any FOD or sealant beyond the distal end 836. In further embodiments, measurements 1310 are filtered such that outlier readings within a local region are ignored, or such that measurements 1310 are otherwise smoothed or normalized.

Figure 14:
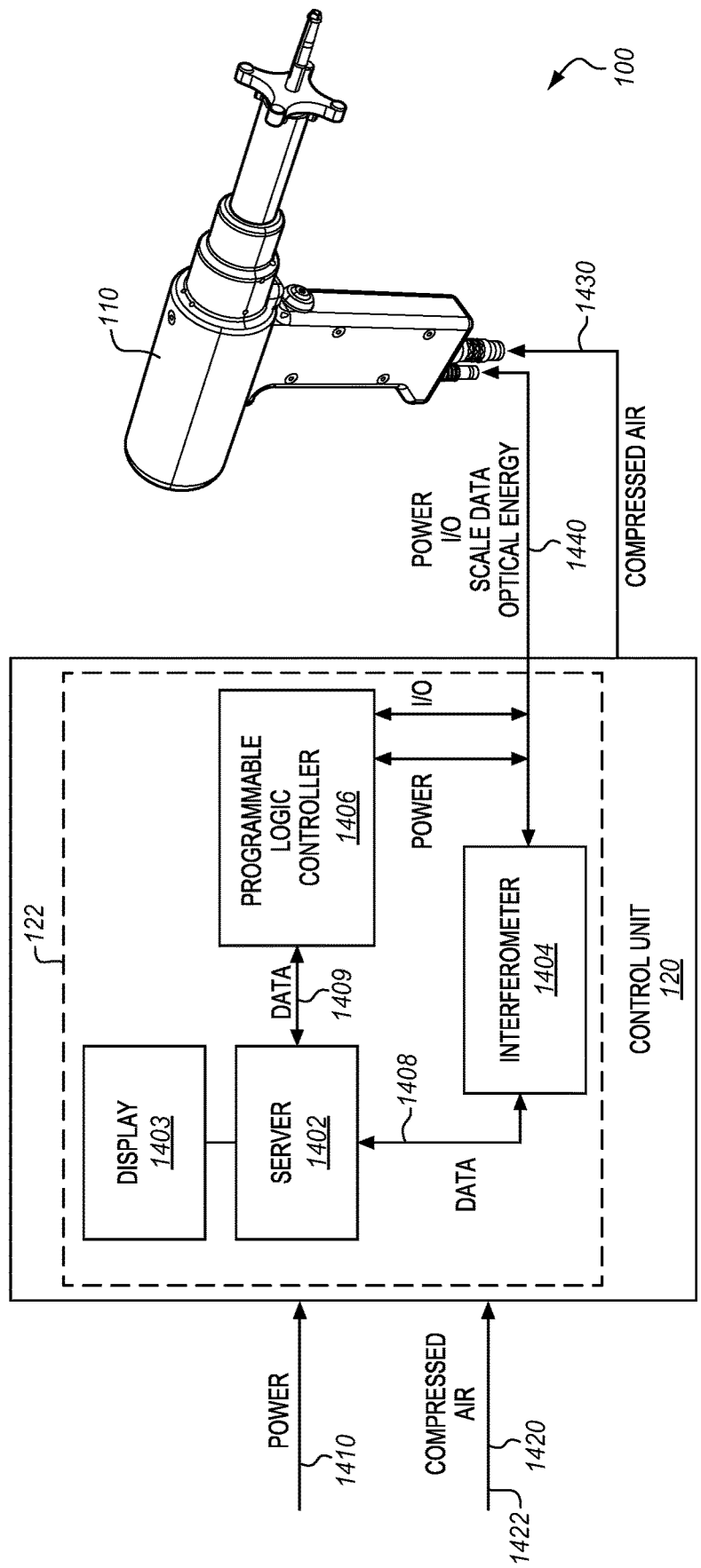
FIG. 14 is a functional diagram depicting internal components of a hole measurement system in an illustrative embodiment.

FIG. 14 is a functional diagram depicting internal components of a hole measurement system 100 in an illustrative embodiment. In this embodiment, control unit 120 receives electrical power via power line 1410, and is coupled with a pressurized air supply (e.g., shop air) via compressed air line 1420 at pneumatic pressure 1422.

The hand tool 110 is coupled with umbilical 1430, which provides pneumatic pressure 1422, and is also coupled with umbilical 1440 which comprises one or more electrical connections for receiving power and instructions, and/or exchanging data with programmable logic controller 1406. In this embodiment, umbilical 1440 also includes a fiber optic line (not shown) which conveys optical energy 854 between interferometer 1404 and hand tool 110.

The control unit 120 includes a controller 122 in the form of a server 1402 coupled with a display 1403 (e.g., a screen, touchscreen, etc.). Because the display 1403 is located remotely from the operator in this embodiment, the display 1403 may store the profiles 128 for later viewing by an operator, may display the profiles 128 to another operator at the control unit 120, or may even transmit the profiles 128 for display at a mobile device (e.g., tablet) of the operator. The server 1402 processes input from interferometer 1404 via data line 1408 to determine measurements 1310, and correlates measurements 1310 with data received from scale 440 as reported by programmable logic controller 1406 over data line 1409. The programmable logic controller 1406 provides power to scale 440 and/or motor 450 via umbilical 1440, and receives data for reporting to server 1402.

Based on the information provided to server 1402, server 1402 may update display 1403 in order to present one or more profiles (e.g., profile 1300) each time a hole 130 is measured. Server 1402 may further annotate and/or report measurements of a dimension 142 of an interface gap 140, based on received data.

Turning now to FIG. 15, an illustration of an aircraft 1500 is depicted for which the fabrication systems and methods described herein may be implemented in an illustrative embodiment. In this illustrative example, aircraft 1500 includes wing 1550 and wing 1560 attached to fuselage 1524 having a nose 1520. Aircraft 1500 includes engine 1540 attached to wing 1560 and engine 1530 attached to wing 1550. Tail section 1580 is also attached to fuselage 1524. Horizontal stabilizer 1581, horizontal stabilizer 1582, and vertical stabilizer 1583 are attached to tail section 1580 of fuselage 1524. The fuselage 1524 itself is formed from multiple barrel sections 1522 which have been joined together. In this embodiment, three of barrel sections 1522 are labeled, but any suitable number of barrel sections may be utilized to form the fuselage 1524 as a matter of design choice. Hand tool 110 may be utilized, for example, to measure any ones of holes 130 disposed at joints 1526 between barrel sections, at joints 1526 along wings 1560 and 1550, or in any other suitable locations (e.g., joints, seams, etc.) at the airframe.

Figure 16:
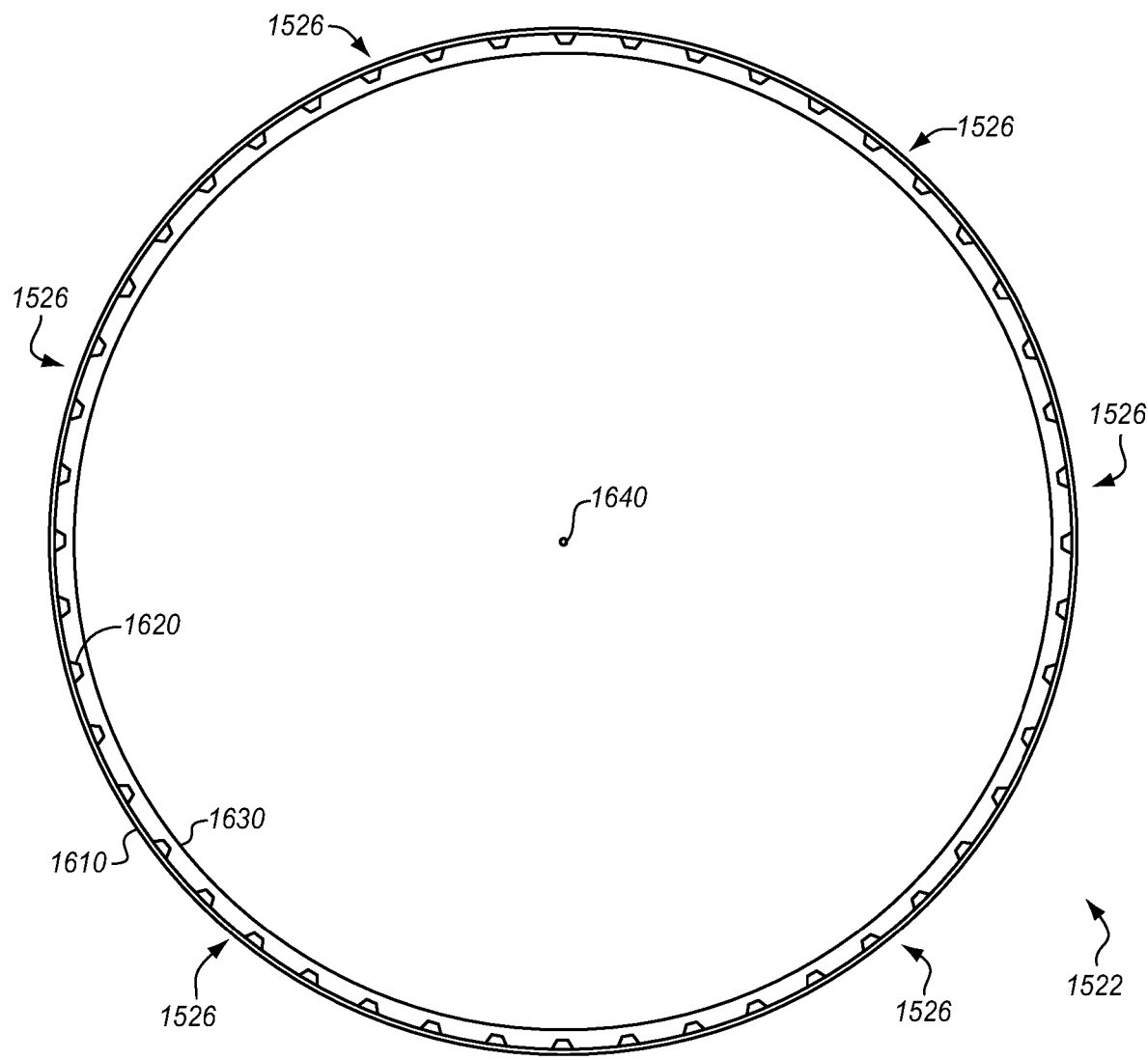
FIG. 16 is a section cut view of a barrel section of an aircraft in an illustrative embodiment.

FIG. 16 is a section cut view of a barrel section 1522 of an aircraft 1500 in an illustrative embodiment. In this embodiment, barrel section 1522, is arranged radially about a point 1640, and includes a skin 1610, stringers 1620, and frames 1630. The various techniques discussed above may be applied to measure holes used for fastening any component of an airframe, including barrel section, wings, and other portions of an airframe. In this FIG., it can be seen that the joint 1526 proceeds circumferentially about the barrel section 1522.

EXAMPLES

In the following examples, additional processes, systems, and methods are described in the context of a hole measurement system.

Figure 17:
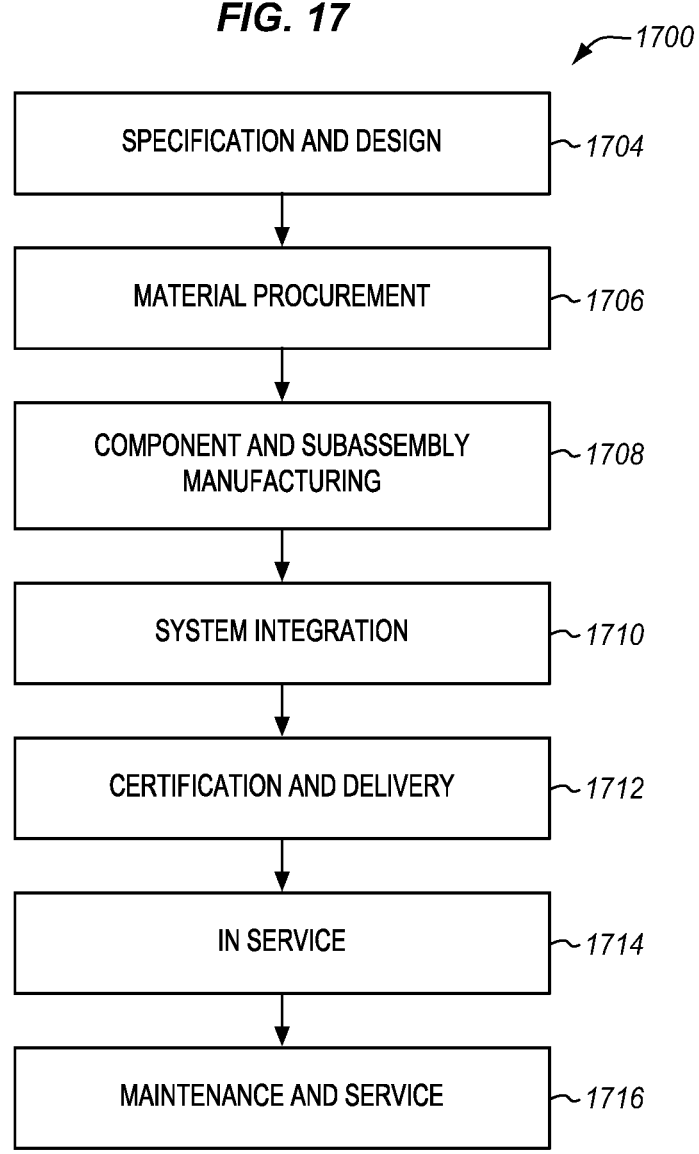
FIG. 17 is a flow diagram of aircraft production and service methodology in an illustrative embodiment.
Figure 18:
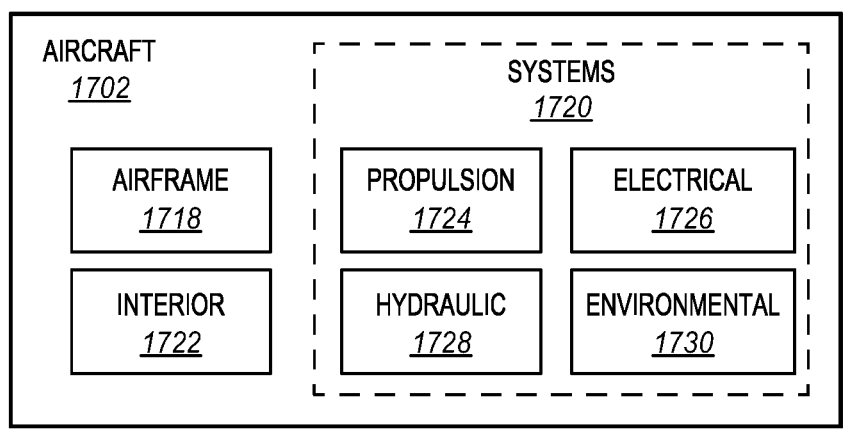
FIG. 18 is a block diagram of an aircraft in an illustrative embodiment.

Referring more particularly to the drawings, embodiments of the disclosure may be described in the context of aircraft manufacturing and service in method 1700 as shown in FIG. 17 and an aircraft 1702 as shown in FIG. 18. During pre-production, method 1700 may include specification and design 1704 of the aircraft 1702 and material procurement 1706. During production, component and subassembly manufacturing 1708 and system integration 1710 of the aircraft 1702 takes place. Thereafter, the aircraft 1702 may go through certification and delivery 1712 in order to be placed in service 1714. While in service by a customer, the aircraft 1702 is scheduled for routine work in maintenance and service 1716 (which may also include modification, reconfiguration, refurbishment, and so on). Apparatus and methods embodied herein may be employed during any one or more suitable stages of the production and service described in method 1700 (e.g., specification and design 1704, material procurement 1706, component and subassembly manufacturing 1708, system integration 1710, certification and delivery 1712, service 1714, maintenance and service 1716) and/or any suitable component of aircraft 1702 (e.g., airframe 1718, systems 1720, interior 1722, propulsion system 1724, electrical system 1726, hydraulic system 1728, environmental system 1730).

Each of the processes of method 1700 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 18, the aircraft 1702 produced by method 1700 may include an airframe 1718 with a plurality of systems 1720 and an interior 1722. Examples of systems 1720 include one or more of a propulsion system 1724, an electrical system 1726, a hydraulic system 1728, and an environmental system 1730. Any number of other systems may be included. Although an aerospace example is shown, the principles of the invention may be applied to other industries, such as the automotive industry.

As already mentioned above, apparatus and methods embodied herein may be employed during any one or more of the stages of the production and service described in method 1700. For example, components or subassemblies corresponding to component and subassembly manufacturing 1708 may be fabricated or manufactured in a manner similar to components or subassemblies produced while the aircraft 1702 is in service. Also, one or more apparatus embodiments, method embodiments, or a combination thereof may be utilized during the subassembly manufacturing 1708 and system integration 1710, for example, by substantially expediting assembly of or reducing the cost of an aircraft 1702. Similarly, one or more of apparatus embodiments, method embodiments, or a combination thereof may be utilized while the aircraft 1702 is in service, for example and without limitation during the maintenance and service 1716. Thus, the invention may be used in any stages discussed herein, or any combination thereof, such as specification and design 1704, material procurement 1706, component and subassembly manufacturing 1708, system integration 1710, certification and delivery 1712, service 1714, maintenance and service 1716 and/or any suitable component of aircraft 1702 (e.g., airframe 1718, systems 1720, interior 1722, propulsion system 1724, electrical system 1726, hydraulic system 1728, and/or environmental system 1730).

In one embodiment, a part comprises a portion of airframe 1718, and is manufactured during component and subassembly manufacturing 1708. The part may then be assembled into an aircraft in system integration 1710, and then be utilized in service 1714 until wear renders the part unusable. Then, in maintenance and service 1716, the part may be discarded and replaced with a newly manufactured part. Inventive components and methods may be utilized throughout component and subassembly manufacturing 1708 in order to manufacture new parts.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

What is claimed is:

1. A method for measuring a hole, comprising:
    inserting a sheathe and a bushing of a hand tool through the hole until an endplate of the hand tool contacts a surface at a proximate end of the hole, wherein the sheathe surrounds the bushing and the bushing surrounds a fiber optic probe;
    retracting the sheathe axially back through the hole with respect to the bushing and the endplate to expand a diameter of the sheathe until prongs disposed at the sheathe exceed a diameter of the hole;
    continuing retracting the sheathe until the prongs contact a surface at a distal end of the hole such that the prongs and the endplate clamp the hand tool within the hole between the surface at the proximate end of the hole and the surface at the distal end of the hole; and
    driving the fiber optic probe through the sheathe and the bushing into the hole to begin inspecting walls of the hole;
    determining a profile by scanning walls of the hole via the fiber optic probe; and
    determining whether an interface gap exists at the walls of the hole based on the profile.

2. The method of claim 1 further comprising:
    if the interface gap exists, reporting a dimension of the interface gap.

3. The method of claim 1 further wherein:
    the scanning the walls of the hole is performed by activating the fiber optic probe to transmit optical energy through a slot arranged axially in the sheathe and a slot arranged axially in the bushing, wherein the slot in the sheathe and the slot in the bushing are both aligned with an emitter of the fiber optic probe.

4. The method of claim 1 wherein:
    the scanning the walls of the hole is performed by transmitting optical energy through a slot arranged axially in the sheathe.

5. The method of claim 1 wherein:
    the scanning the walls of the hole comprises performing Low-Coherence Interferometry at the walls of the hole.

6. The method of claim 1 wherein:
    the scanning the walls of the hole comprises acquiring a data for a field of view of the fiber optic probe as the fiber optic probe is driven through the hole.

7. The method of claim 6 wherein:
    the acquiring the data is performed for each of multiple fields of view arranged along a circumference of the hole.

8. The method of claim 1 further comprising:
    if the interface gap exists, identifying sealant at the interface gap based on a region of the profile representing the interface gap.

9. The method of claim 1 further comprising:
    if the interface gap exists, identifying Foreign Object Debris (FOD) at the interface gap based on the profile.

10. The method of claim 1 further comprising:
    fastening a first component of an aircraft to a second component of the aircraft, wherein the hole passes through the first component of the aircraft and the second component of the aircraft.

11. A method for measuring at a hole, comprising:
    inserting a sheathe and a bushing of a hand tool through the hole until an endplate of the hand tool contacts a surface at a proximate end of the hole, wherein the sheathe surrounds the bushing and the bushing surrounds a fiber optic probe;
    retracting the sheathe axially back through the hole with respect to the bushing and the endplate to expand a diameter of the sheathe until prongs disposed at the sheathe exceed a diameter of the hole;
    continuing retracting the sheathe until the prongs contact a surface at a distal end of the hole such that the prongs and the endplate clamp the hand tool within the hole between the surface at the proximate end of the hole and the surface at the distal end of the hole; and
    once the hand tool is clamped, driving the fiber optic probe of the hand tool through the sheathe and the bushing into the hole to begin inspecting walls of the hole.

12. The method of claim 11 further comprising:
    determining whether an interface gap exists at the walls of the hole by scanning the walls of the hole via the fiber optic probe as the fiber optic probe is driven into the hole.

13. The method of claim 12 further comprising:
    reporting a dimension of the interface gap via a control unit coupled with the hand tool.

14. The method of claim 13 wherein:
    the reporting the dimension of the interface gap comprises updating a display or generating an electronic message.

15. The method of claim 12 wherein:
    the scanning the walls of the hole is performed by activating the fiber optic probe to transmit optical energy through a slot arranged axially in the sheathe and a slot arranged axially in the bushing, wherein the slot in the sheathe and the slot in the bushing are both aligned with an emitter of the fiber optic probe.

16. The method of claim 12 wherein:
the scanning the walls of the hole comprises performing Low-Coherence Interferometry (LCI) at the hole.

17. The method of claim 12 further comprising:
if the interface gap exists, identifying sealant at the interface gap.

18. The method of claim 12 further comprising:
if the interface gap exists, identifying Foreign Object Debris (FOD) at the interface gap.

19. The method of claim 12 wherein:
the scanning the walls of the hole comprises acquiring a data for a field of view of the fiber optic probe as the fiber optic probe is driven through the hole.

20. The method of claim 19 wherein:
the acquiring the data is performed for each of multiple fields of view arranged along a circumference of the hole.

21. The method of claim 12 further comprising:
determining a profile by scanning the walls of the hole via the fiber optic probe; and
if the interface gap exists, identifying sealant at the interface gap based on a region of the profile representing the interface gap.

22. The method of claim 12 further comprising:
determining a profile by scanning the walls of the hole via the fiber optic probe; and
wherein the determining whether an interface gap exists comprises comparing expected measurements in the profile to actual measurements in the profile.

23. The method of claim 11 further comprising:
fastening a first component of an aircraft to a second component of the aircraft, wherein the hole passes through the first component of the aircraft and the second component of the aircraft.

24. The method of claim 11 further comprising:
determining a profile by scanning the walls of the hole via the fiber optic probe.

25. The method of claim 11 wherein:
the driving the fiber optic probe comprises adjusting a depthwise position of the fiber optic probe relative to the hole.

26. The method of claim 11 wherein:
the driving the fiber optic probe comprises extending the fiber optic probe through the hole.

27. The method of claim 11 wherein:
the driving the fiber optic probe is performed without the fiber optic probe contacting the walls of the hole.

* * * * *